United States Patent
Moore et al.

(10) Patent No.: US 12,066,192 B2
(45) Date of Patent: Aug. 20, 2024

(54) SMART INDOOR AIR VENTING SYSTEM

(71) Applicant: Broan-NuTone LLC, Hartford, WI (US)

(72) Inventors: Mike Moore, Hartford, WI (US);
Richard R. Sinur, Hartford, WI (US);
Jason Asmus, Hartford, WI (US);
Seddik Rougab, Hartford, WI (US);
Taylor Schroeder, Hartford, WI (US);
Eric Theriault, Hartford, WI (US)

(73) Assignee: Broan-NuTone LLC, Hartford, WI (US)

( * ) Notice: Subject to any disclaimer, the term of this patent is extended or adjusted under 35 U.S.C. 154(b) by 482 days.

(21) Appl. No.: 17/298,362

(22) PCT Filed: Nov. 27, 2019

(86) PCT No.: PCT/US2019/063581
§ 371 (c)(1),
(2) Date: May 28, 2021

(87) PCT Pub. No.: WO2020/112981
PCT Pub. Date: Jun. 4, 2020

(65) Prior Publication Data
US 2022/0113034 A1   Apr. 14, 2022

Related U.S. Application Data

(60) Provisional application No. 62/772,724, filed on Nov. 29, 2018.

(51) Int. Cl.
*F24C 15/20* (2006.01)
*F24F 7/007* (2006.01)
(Continued)

(52) U.S. Cl.
CPC .......... *F24C 15/2021* (2013.01); *F24C 15/20* (2013.01); *F24F 7/007* (2013.01);
(Continued)

(58) Field of Classification Search
CPC ....... F24C 15/2021; F24C 15/20; F24F 7/007; F24F 11/00001; F24F 2110/20; F24F 2110/50; F24F 2110/10; F24F 2130/00
(Continued)

(56) References Cited

U.S. PATENT DOCUMENTS 1,143,053 A   6/1915  Harrison
3,653,443 A   4/1972  Dockery
(Continued)

FOREIGN PATENT DOCUMENTS

CA   2297682   8/2001
CA   2600529   9/2007
(Continued)

OTHER PUBLICATIONS

English Translation of portions of Office Action for Chinese Patent Application No. 202080008234.4, mailed Jul. 19, 2023 (3 pages).
(Continued)

*Primary Examiner* — Avinash A Savani
(74) *Attorney, Agent, or Firm* — Barnes & Thornburg LLP

(57) ABSTRACT

A venting system in accordance with the present disclosure includes a ventilation fan and one or more sensors coupled to the ventilation fan. The ventilation fan is positioned to vent air from an indoor environment. The sensors are positioned to monitor conditions in the indoor environment and selectively operate the ventilation fan to condition air in the indoor environment.

19 Claims, 21 Drawing Sheets

(51) Int. Cl.
*F24F 11/00* (2018.01)
*F24F 110/10* (2018.01)
*F24F 110/20* (2018.01)
*F24F 110/50* (2018.01)
*F24F 130/00* (2018.01)

(52) U.S. Cl.
CPC ....... *F24F 11/0001* (2013.01); *F24F 2110/10* (2018.01); *F24F 2110/20* (2018.01); *F24F 2110/50* (2018.01); *F24F 2130/00* (2018.01)

(58) Field of Classification Search
USPC .................................................. 126/299 R
See application file for complete search history.

(56) References Cited

U.S. PATENT DOCUMENTS

| | | |
|---|---|---|
| 3,802,767 A | 4/1974 | Rambauske |
| 5,232,152 A | 8/1993 | Tsang |
| 5,240,455 A | 8/1993 | Sharp |
| 5,515,840 A | 5/1996 | Jang |
| 5,540,744 A | 7/1996 | Renna |
| 5,541,579 A | 7/1996 | Kiernan |
| 5,577,490 A | 11/1996 | Overton |
| 5,608,383 A | 3/1997 | Neil |
| 5,628,242 A | 5/1997 | Higley |
| 5,642,784 A | 7/1997 | Guay et al. |
| 5,697,450 A | 12/1997 | Stehling et al. |
| 5,713,346 A | 2/1998 | Kuechler |
| 5,717,188 A | 2/1998 | Vaillancourt |
| 5,720,661 A | 2/1998 | Yoshizawa et al. |
| 5,738,083 A | 4/1998 | Pettinari |
| 5,746,114 A | 5/1998 | Harris |
| 5,803,072 A | 9/1998 | Strand |
| 5,805,767 A | 9/1998 | Jouas et al. |
| 5,809,990 A | 9/1998 | Jones et al. |
| 5,868,205 A | 2/1999 | Cunningham et al. |
| 5,871,057 A | 2/1999 | Stehling et al. |
| 5,884,619 A | 3/1999 | Terry |
| 5,890,484 A | 4/1999 | Yamada |
| 5,893,996 A | 4/1999 | Gross et al. |
| 5,900,174 A | 5/1999 | Scott |
| 5,919,385 A | 7/1999 | Kersten et al. |
| 5,938,425 A | 8/1999 | Damrath et al. |
| 5,945,017 A | 8/1999 | Cheng et al. |
| 5,951,898 A | 9/1999 | Bailleul et al. |
| 5,958,272 A | 9/1999 | Taplan et al. |
| 6,013,901 A | 1/2000 | Lavoie |
| 6,029,751 A | 2/2000 | Ford et al. |
| 6,032,663 A | 3/2000 | Pencheon |
| 6,041,772 A | 3/2000 | Ward et al. |
| 6,041,774 A | 3/2000 | Ward et al. |
| 6,044,913 A | 4/2000 | Stehling et al. |
| 6,058,929 A | 5/2000 | Fritz |
| 6,067,980 A | 5/2000 | Kahlke et al. |
| 6,118,107 A | 9/2000 | Kobrich |
| 6,130,413 A | 10/2000 | Rak |
| 6,133,552 A | 10/2000 | Saulnier et al. |
| 6,133,559 A | 10/2000 | Park |
| 6,140,617 A | 10/2000 | Berkcan et al. |
| 6,168,418 B1 | 1/2001 | Levinson |
| 6,170,480 B1 | 1/2001 | Melink et al. |
| 6,173,710 B1 | 1/2001 | Gibson et al. |
| 6,173,791 B1 | 1/2001 | Yen |
| 6,182,653 B1 | 2/2001 | Otenbaker et al. |
| 6,218,654 B1 | 4/2001 | Braunisch |
| 6,230,980 B1 | 5/2001 | Hudson |
| 6,235,090 B1 | 5/2001 | Bernstein et al. |
| 6,253,761 B1 | 7/2001 | Shuler et al. |
| 6,267,112 B1 | 7/2001 | Chiang |
| 6,276,358 B1 | 8/2001 | Brin, Jr. et al. |
| 6,280,180 B1 | 8/2001 | Fredin-Garcia-Jurado et al. |
| 6,281,481 B1 | 8/2001 | Tiemann |
| 6,287,108 B1 | 9/2001 | Rothenberger et al. |
| 6,294,994 B1 | 9/2001 | Hoellerich |
| 6,300,603 B1 | 10/2001 | Edwards et al. |
| 6,341,601 B1 | 1/2002 | Ward et al. |
| 6,341,655 B1 | 1/2002 | Busian et al. |
| 6,344,074 B1 | 2/2002 | Ward et al. |
| 6,347,626 B1 | 2/2002 | Yi |
| 6,349,716 B1 | 2/2002 | Philip |
| 6,350,971 B1 | 2/2002 | Smolenski et al. |
| 6,356,425 B1 | 3/2002 | Jung |
| 6,403,932 B1 | 6/2002 | Nelson et al. |
| 6,411,215 B1 | 6/2002 | Shnier |
| 6,417,496 B1 | 7/2002 | Bates et al. |
| 6,444,958 B1 | 9/2002 | Campbell |
| 6,452,136 B1 | 9/2002 | Berkcan et al. |
| 6,453,687 B2 | 9/2002 | Sharood et al. |
| 6,454,834 B1 | 9/2002 | Livingstone et al. |
| 6,462,316 B1 | 10/2002 | Berkcan et al. |
| 6,492,627 B1 | 12/2002 | Ensinger et al. |
| 6,501,054 B2 | 12/2002 | Engelmann et al. |
| 6,506,109 B1 | 1/2003 | Bastian et al. |
| 6,510,901 B2 | 1/2003 | Yen et al. |
| 6,538,238 B1 | 3/2003 | Berkcan et al. |
| 6,551,185 B1 | 4/2003 | Miyake et al. |
| 6,554,197 B2 | 4/2003 | Marbach et al. |
| 6,569,007 B2 | 5/2003 | Bastian et al. |
| 6,619,613 B1 | 9/2003 | Akamatsu et al. |
| 6,620,038 B1 | 9/2003 | Kikuchi et al. |
| 6,621,058 B1 | 9/2003 | Kim |
| 6,622,717 B1 | 9/2003 | Kim |
| 6,632,132 B1 | 10/2003 | Kikuchi et al. |
| 6,634,939 B2 | 10/2003 | Johnson |
| 6,647,978 B1 | 11/2003 | Khosropour et al. |
| 6,648,937 B1 | 11/2003 | Nguyen et al. |
| 6,692,348 B1 | 2/2004 | Cauthorne |
| 6,698,419 B2 | 3/2004 | Lee |
| 6,699,119 B2 | 3/2004 | Boulanger et al. |
| 6,715,484 B2 | 4/2004 | Khosropour et al. |
| 6,723,970 B1 | 4/2004 | Whipple, Jr. |
| 6,726,111 B2 | 4/2004 | Weimer et al. |
| 6,729,729 B1 | 5/2004 | Irons |
| 6,752,711 B1 | 6/2004 | Yeung |
| 6,776,152 B2 | 8/2004 | Lee |
| 6,797,041 B2 | 9/2004 | Brownell et al. |
| 6,802,310 B1 | 10/2004 | Yeung |
| 6,802,311 B1 | 10/2004 | Yeung |
| 6,805,114 B2 | 10/2004 | Outten et al. |
| 6,807,962 B2 | 10/2004 | Taplan et al. |
| 6,808,545 B1 | 10/2004 | Shuler, Sr. |
| 6,813,575 B2 | 11/2004 | Laflamme |
| 6,815,648 B2 | 11/2004 | Badami et al. |
| 6,920,874 B1 | 7/2005 | Siegel |
| 6,924,469 B1 | 8/2005 | Strong |
| 6,930,290 B2 | 8/2005 | Kijimoto et al. |
| 6,940,048 B2 | 9/2005 | Wilkins |
| 7,002,109 B2 | 2/2006 | Klask |
| 7,005,986 B2 | 2/2006 | Parks, III et al. |
| 7,015,433 B2 | 3/2006 | Rado et al. |
| 7,044,397 B2 | 5/2006 | Bartlett et al. |
| 7,048,199 B2 | 5/2006 | Melink |
| 7,112,766 B2 | 9/2006 | Lerner |
| 7,186,954 B2 | 3/2007 | Wilkins |
| 7,327,246 B2 | 2/2008 | Schoor |
| 7,342,205 B2 | 3/2008 | Wilkins et al. |
| 7,409,311 B2 | 8/2008 | Imgram et al. |
| 7,473,872 B2 | 1/2009 | Takimoto |
| 7,475,828 B2 | 1/2009 | Bartlett et al. |
| 7,569,798 B2 | 8/2009 | Thimm et al. |
| 7,607,488 B2 | 10/2009 | Durham |
| 7,632,178 B2 | 12/2009 | Meneely, Jr. |
| 7,699,051 B2 | 4/2010 | Gagas et al. |
| 7,895,019 B2 | 2/2011 | Neumann et al. |
| 7,969,330 B2 | 6/2011 | Philipp |
| 7,979,163 B2 | 7/2011 | Terlson et al. |
| 7,999,689 B1 | 8/2011 | Ray et al. |
| 8,038,515 B2 | 10/2011 | Livchak et al. |
| 8,057,219 B1 | 11/2011 | Manning et al. |
| 8,061,347 B2 | 11/2011 | Manning |
| 8,075,304 B2 | 12/2011 | Cox et al. |
| 8,100,746 B2 | 1/2012 | Heidel et al. |
| 8,147,302 B2 | 4/2012 | Desrochers et al. |

(56) References Cited

U.S. PATENT DOCUMENTS

| | | |
|---|---|---|
| 8,230,939 B1 | 7/2012 | Reynolds |
| 8,246,705 B2 | 8/2012 | Bain et al. |
| 8,276,680 B2 | 10/2012 | Bouthiette et al. |
| 8,316,839 B2 | 11/2012 | Kellogg et al. |
| 8,403,661 B2 | 3/2013 | Mateos Martin |
| 8,420,984 B2 | 4/2013 | Kaiser et al. |
| 8,444,462 B2 | 5/2013 | Livchak et al. |
| 8,464,635 B1 | 6/2013 | Sprinkle et al. |
| 8,482,884 B2 | 7/2013 | Hennessey, Jr. |
| 8,517,117 B2 | 8/2013 | Mikulec |
| 8,604,935 B2 | 12/2013 | Shah et al. |
| 8,610,036 B2 | 12/2013 | Ewell, Jr. et al. |
| 8,755,942 B2 | 6/2014 | Bonilla et al. |
| 8,921,743 B2 | 12/2014 | Ewell, Jr. et al. |
| 9,010,313 B2 | 4/2015 | Mikulec |
| 9,109,981 B2 | 8/2015 | Sharp |
| 9,255,714 B2 | 2/2016 | Mikulec |
| 9,347,678 B2 | 5/2016 | Stakutis et al. |
| 9,389,020 B2 | 7/2016 | Ewell et al. |
| 9,494,324 B2 | 11/2016 | Livchak et al. |
| 9,618,222 B1 | 4/2017 | Hussain et al. |
| 9,618,224 B2 | 4/2017 | Emmons et al. |
| 9,618,948 B2 | 4/2017 | Yamaguchi et al. |
| 9,677,772 B2 | 6/2017 | Siegel et al. |
| 9,924,243 B2 | 3/2018 | Lupien et al. |
| 9,946,670 B2 | 4/2018 | Klein et al. |
| 10,082,299 B2 | 9/2018 | Livchak et al. |
| 10,085,585 B2 | 10/2018 | Siegel et al. |
| 10,126,009 B2 | 11/2018 | Flaherty et al. |
| 10,234,158 B2 | 3/2019 | Laughman et al. |
| 10,242,129 B2 | 3/2019 | Flaherty et al. |
| 10,281,896 B1 | 5/2019 | Goodman et al. |
| 10,305,323 B2 | 5/2019 | Wester et al. |
| 10,309,668 B2 | 6/2019 | Song et al. |
| 10,347,112 B2 | 7/2019 | Myllymäki |
| 10,458,668 B2 | 10/2019 | Emmons et al. |
| 10,490,055 B2 | 11/2019 | Myllymäki |
| 10,514,177 B2 | 12/2019 | Hussain et al. |
| 10,527,307 B2 | 1/2020 | Saffre et al. |
| 10,529,215 B2 | 1/2020 | Brown |
| 10,598,398 B2 | 3/2020 | Wiley et al. |
| 10,655,884 B2 | 5/2020 | Iura et al. |
| 10,712,038 B2 | 7/2020 | Ribbich et al. |
| 10,837,665 B2 | 11/2020 | Ajax et al. |
| 10,859,283 B1 | 12/2020 | Goodman et al. |
| 10,867,254 B2 | 12/2020 | Benazzouz et al. |
| 10,907,844 B2 | 2/2021 | Ribbich et al. |
| 10,915,669 B2 | 2/2021 | Flaherty et al. |
| 10,928,084 B2 | 2/2021 | Ajax et al. |
| 11,009,248 B2 | 5/2021 | Salem et al. |
| 2002/0113062 A1 | 8/2002 | Cranford |
| 2002/0130190 A1 | 9/2002 | Marbach et al. |
| 2003/0159688 A1 | 8/2003 | Outten et al. |
| 2005/0098170 A1 | 5/2005 | Raynor |
| 2005/0156053 A1 | 7/2005 | Melink |
| 2005/0224069 A1 | 10/2005 | Patil et al. |
| 2005/0260946 A1 | 11/2005 | Kim |
| 2006/0278216 A1* | 12/2006 | Gagas .......... F24C 15/2028 126/299 D |
| 2007/0125356 A1 | 6/2007 | Crnkovich |
| 2007/0125364 A1 | 6/2007 | Crnkovich |
| 2007/0175888 A1 | 8/2007 | Wash |
| 2008/0231468 A1 | 9/2008 | Myllymaki |
| 2009/0017404 A1 | 1/2009 | White et al. |
| 2009/0085754 A1 | 4/2009 | Myllymaki |
| 2009/0229473 A1 | 9/2009 | Vidojevic et al. |
| 2009/0321413 A1 | 12/2009 | Egenter et al. |
| 2009/0322414 A1 | 12/2009 | Oraw et al. |
| 2010/0089240 A1 | 4/2010 | Krichtafovitch |
| 2010/0163012 A1 | 7/2010 | Adar et al. |
| 2010/0192939 A1 | 8/2010 | Parks |
| 2010/0239987 A1 | 9/2010 | Baier |
| 2011/0048397 A1 | 3/2011 | Kellogg et al. |
| 2011/0083663 A1 | 4/2011 | Baier et al. |
| 2011/0134413 A1 | 6/2011 | Has et al. |
| 2011/0146649 A1 | 6/2011 | Brenner |
| 2011/0269386 A1 | 11/2011 | Burdett et al. |
| 2011/0275301 A1 | 11/2011 | Burdett et al. |
| 2011/0278285 A1 | 11/2011 | Sadahira et al. |
| 2011/0284091 A1 | 11/2011 | Livchak et al. |
| 2012/0068556 A1 | 3/2012 | Shah et al. |
| 2012/0111314 A1 | 5/2012 | Corleoni |
| 2012/0152229 A1 | 6/2012 | Huang |
| 2013/0048319 A1 | 2/2013 | Glaub et al. |
| 2013/0092404 A1 | 4/2013 | Mikulec |
| 2013/0187781 A1 | 7/2013 | Bach |
| 2013/0226849 A1 | 8/2013 | Benazzouz et al. |
| 2014/0230662 A1* | 8/2014 | Siegel .......... F24C 15/2021 99/344 |
| 2015/0032264 A1 | 1/2015 | Emmons et al. |
| 2015/0096335 A1 | 4/2015 | Haidak et al. |
| 2015/0096352 A1 | 4/2015 | Haidak et al. |
| 2015/0369507 A1 | 12/2015 | Flaherty et al. |
| 2016/0066068 A1 | 3/2016 | Schultz et al. |
| 2016/0209070 A1* | 7/2016 | Hrejsa .......... F24F 11/523 |
| 2016/0231014 A1 | 8/2016 | Ro et al. |
| 2016/0318368 A1 | 11/2016 | Alger et al. |
| 2016/0361452 A1 | 12/2016 | Blackley |
| 2017/0084156 A1 | 3/2017 | Myllymäki |
| 2017/0168467 A1 | 6/2017 | Liu et al. |
| 2017/0176030 A1 | 6/2017 | Emmons et al. |
| 2017/0328591 A1 | 11/2017 | Kelly et al. |
| 2017/0350611 A1 | 12/2017 | Su et al. |
| 2018/0156483 A1 | 6/2018 | Kim et al. |
| 2018/0156484 A1 | 6/2018 | Kim et al. |
| 2018/0158315 A1 | 6/2018 | Sloo et al. |
| 2018/0299150 A1 | 10/2018 | Ajax et al. |
| 2018/0299151 A1 | 10/2018 | Ajax et al. |
| 2018/0299159 A1 | 10/2018 | Ajax et al. |
| 2019/0154285 A1 | 5/2019 | Pham et al. |
| 2019/0221089 A1 | 7/2019 | Wedig et al. |
| 2019/0288553 A1 | 9/2019 | Wester et al. |
| 2019/0360717 A1 | 11/2019 | Chae |
| 2019/0363576 A1 | 11/2019 | Wester et al. |
| 2020/0072486 A1 | 3/2020 | Matsubara et al. |
| 2020/0088438 A1 | 3/2020 | Shiono et al. |
| 2020/0152040 A1 | 5/2020 | Brown |
| 2020/0224915 A1 | 7/2020 | Nourbakhsh et al. |
| 2020/0232670 A1 | 7/2020 | Ritmanich et al. |
| 2020/0333753 A1 | 10/2020 | Chenier et al. |
| 2020/0381939 A1 | 12/2020 | Wester et al. |
| 2020/0393152 A1 | 12/2020 | Ramirez et al. |
| 2020/0408434 A1 | 12/2020 | Arentsen |
| 2021/0003308 A1 | 1/2021 | Venne |
| 2021/0041118 A1 | 2/2021 | Morgan et al. |
| 2021/0071891 A1 | 3/2021 | Ferrere, Jr. et al. |
| 2021/0088241 A1 | 3/2021 | Goodman et al. |
| 2021/0088248 A1 | 3/2021 | Matsugi et al. |
| 2021/0103260 A1 | 4/2021 | Khurana et al. |
| 2021/0123623 A1 | 4/2021 | Notaro et al. |
| 2021/0131692 A1 | 5/2021 | Martin |
| 2021/0156582 A1 | 5/2021 | Stevenson et al. |
| 2021/0165926 A1 | 6/2021 | Flaherty et al. |
| 2021/0173366 A1 | 6/2021 | Turney et al. |
| 2021/0180815 A1 | 6/2021 | Shamoon et al. |
| 2021/0199329 A9 | 7/2021 | Mowris et al. |
| 2021/0207826 A1 | 7/2021 | Sotokawa et al. |
| 2021/0208546 A1 | 7/2021 | Locke et al. |
| 2021/0231325 A1 | 7/2021 | Stevenson et al. |
| 2021/0239335 A1 | 8/2021 | Morgan et al. |

FOREIGN PATENT DOCUMENTS

| | | |
|---|---|---|
| CA | 2745432 | 6/2010 |
| CA | 2863117 | 11/2014 |
| CA | 2933630 A1 | 3/2017 |
| CN | 101208563 A | 6/2008 |
| CN | 101208563 B | 6/2008 |
| CN | 202003488 U | 10/2011 |
| CN | 102301187 A | 12/2011 |
| CN | 202583769 U | 12/2012 |
| CN | 202885011 U | 4/2013 |
| CN | 103134088 A | 6/2013 |
| CN | 103557579 A | 2/2014 |

(56) References Cited

FOREIGN PATENT DOCUMENTS

| | | | |
|---|---|---|---|
| CN | 203571824 U | 4/2014 | |
| CN | 2014240733 A | 12/2014 | |
| CN | 103557579 B | 2/2015 | |
| CN | 105823172 A | 8/2016 | |
| CN | 105823172 A | 8/2016 | |
| EP | 0901309 A2 | 3/1999 | |
| EP | 0967839 A2 | 12/1999 | |
| EP | 0762059 B1 | 8/2001 | |
| EP | 1861839 B1 | 8/2016 | |
| EP | 3136363 B1 | 7/2018 | |
| FI | 117526 B | 11/2006 | |
| JP | 11287453 A | 10/1999 | |
| JP | H11287489 A | 10/1999 | |
| JP | 2004045016 A | 2/2004 | |
| JP | 2008082634 A | 4/2008 | |
| JP | 2014240733 | 12/2014 | |
| JP | 2018151114 A | 9/2018 | |
| WO | 2004111543 A1 | 12/2004 | |
| WO | 2008031645 A1 | 3/2008 | |
| WO | 2010000947 A2 | 1/2010 | |
| WO | 2010065793 A1 | 6/2010 | |
| WO | WO-2010065793 A1 * | 6/2010 | ......... F24C 15/2021 |
| WO | 2015057073 A1 | 4/2015 | |
| WO | 2015168243 A1 | 11/2015 | |
| WO | WO2020055872 A1 | 3/2020 | |
| WO | WO2020112981 A1 | 6/2020 | |
| WO | WO2020146315 A1 | 7/2020 | |

OTHER PUBLICATIONS

Office Action for Chinese Patent Application No. 202080008234.4, mailed Jul. 19, 2023 (6 pages).

Office Action issued to CN202080008234.4, mailed Jul. 26, 2022 (17 pages).

Office Action issued to Chinese App. No. 202080008234.4 dated Jul. 26, 2022 (16 pages).

Search Report and Written Opinion for PCT Application No. PCT/US23/11580, mailed Apr. 14, 2023 (22 pages).

Office Action for Chinese Patent Application No. 202080008234.4, mailed Apr. 1, 2023 (8 pages).

International Search Report and Written Opinion issued to PCT/US20/12487, mailed Apr. 2, 2020 (14 pages).

English Translation of portions of Office Action for Chinese Patent Application No. 201980077675.7, mailed Jun. 10, 2023 (6 pages).

Canadian Application No. 2,950,887, Office Action mailed Jan. 13, 2022 (4 pages).

Canadian Application No. 2,950,887, Office Action mailed Apr. 30, 2021 (3 pages).

European Patent Application No. 15785450.6, Office Action mailed Apr. 23, 2020 (10 pages).

Chinese Patent Application No. 201580035152.8, Office Action mailed Mar. 28, 2018 (14 pages).

European Patent Application No. 15785450.6, Extended European Search Report dated Dec. 12, 2017 (9 pages).

International Patent Application No. PCT/US2015/028219, International Search Report dated Aug. 5, 2015 (2 pages).

International Patent Application No. PCT/US2015/028219, Written Opinion dated Aug. 5, 2015 (11 pages).

* cited by examiner

US 12,066,192 B2

SMART INDOOR AIR VENTING SYSTEM

PRIORITY CLAIM

This application claims priority under 35 U.S.C. § 119(e) to PCT Application Serial No. US2019/063581, filed Nov. 27, 2019 and U.S. Provisional Application Ser. No. 62/772,724, filed Nov. 29, 2018, the disclosure of which is expressly incorporated by reference herein in its entirety.

STATEMENT OF GOVERNMENT SUPPORT

The subject matter of the present disclosure was made with government support under grant number DE-EE0007569 awarded by the Department of Energy. The government has certain rights in the invention.

BACKGROUND

The present disclosure relates to venting systems, and particularly to indoor air venting systems. More particularly, the present disclosure relates to a venting system for automatically detecting indoor air quality events and controlling ventilation air flow in order to remediate indoor air quality events, thereby controlling indoor air quality.

SUMMARY

A venting system in accordance with the present disclosure includes a ventilation fan and one or more sensors associated with to the ventilation fan. The ventilation fan is positioned to exhaust from an indoor environment. The sensors are positioned to monitor conditions in the indoor environment and the system selectively operates the ventilation fan based on sensor output to condition air in the indoor environment.

In illustrative embodiments, the sensors are part of an indoor air quality (IAQ) event detector. The IAQ event detector measures characteristics of the indoor environment to detect an IAQ event that produces undesirable conditions in the indoor environment. The IAQ event detector automatically operates the ventilation fan when an IAQ event is detected.

In illustrative embodiments, the IAQ event detector determines a fan speed for the ventilation fan based on the measured characteristics of the indoor environment. In some instances, the presence, absence or severity of an IAQ event can be determined by one or more direct measurements of the air quality (e.g. level of volatile organic compounds, relative humidity, etc.). In other instances, the presence, absence or severity of an IAQ event can be determined by one or more indirect measurements of the air quality (e.g. the temperature of the exhaust air or of an adjacent cooking device, etc. can be used to predict an IAQ). The IAQ event detector turns the ventilation fan on when an IAQ event is detected, if the ventilation fan is not already on, and changes the fan speed in response to changing conditions of the indoor environment. The IAQ event detector turns the ventilation fan off when the IAQ event has been detected to have ended or the indoor air quality of the indoor environment has returned to predetermined acceptable levels.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
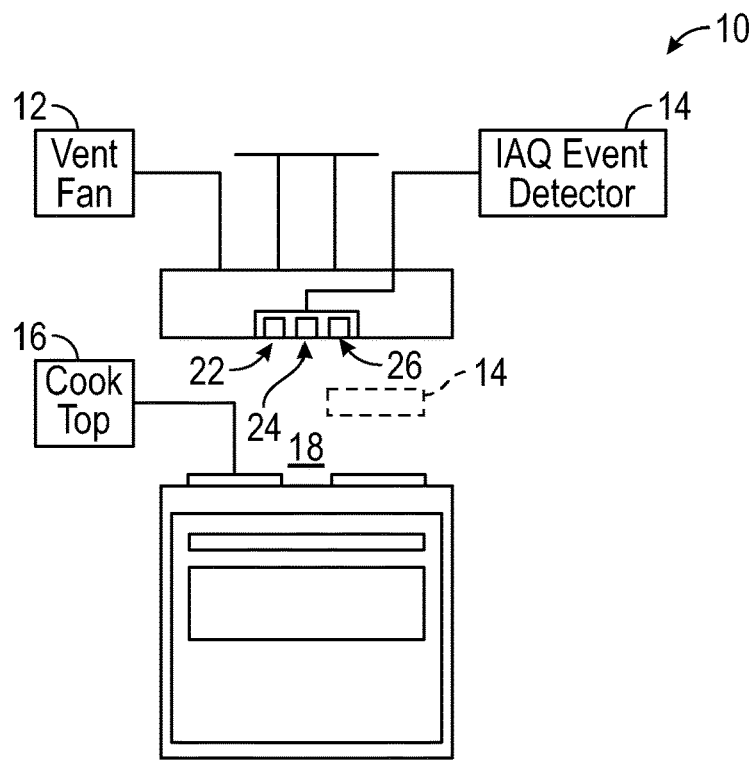
FIG. 1 is a diagrammatic view of one embodiment of an exemplary venting system in accordance with the present disclosure.

One embodiment of a venting system 10 in accordance with the present disclosure is shown in FIG. 1. FIG. 1 depicts a conventional range hood located above a cook top 16. The disclosed invention is also applicable to any other venting systems. Non-limiting examples of alternative venting systems are the downdraft ventilation systems disclosed in U.S. Pat. No. 9,297,540 and Published United States Patent Application 2016/0209049. The venting system 10 includes a ventilation fan 12 (referred to as a vent fan in the figures) and an indoor air quality event detector 14 operatively coupled to the ventilation fan 12 for controlling operation of the ventilation fan 12 as further described herein. In the illustrative embodiment, the ventilation fan 12 is positioned over a cook top 16, and the IAQ event detector 14 is configured to monitor an environment 18 surrounding the cook top 16 and selectively operate the ventilation fan 12 to control the air quality in the indoor environment 18. In some embodiments, the IAQ event detector 14 can be integrated with the ventilation fan 12 or positioned in another location, such as for example in a vent hood or a backsplash, and in communication with the ventilation fan 12, such as through a wired or wireless connection. In some embodiments, the IAQ event detector 14 is integrated into a control unit or in communication with a control unit of the ventilation fan 12 used to operate the ventilation fan 12.

The venting system 10 is a "smart" system in that the ventilation fan 12 is automatically operated and controlled by the IAQ event detector 14 in an energy efficient manner, and without requiring user interaction, in response to detecting the IAQ event detector 14 detecting an IAQ event in the environment 18 according to preset thresholds of environmental conditions sensed by the IAQ event detector 14. In some embodiments, an IAQ event is determined to have occurred when sensed conditions in the environment 18 either become undesirable or, based on sensed conditions, are likely to become undesirable without conditioning of the air in the environment 18 by the ventilation fan 12. In some embodiments, the IAQ event detector 14 monitors the environment 18 and detects an IAQ event based on indicators that pollutants are going to be introduced into the indoor air environment 18, such as when the cook top 16 heats up signaling that smoke and/or excess humidity are likely to be introduced into the environment 18. In some embodiments, the IAQ event detector 14 monitors the environment 18 and detects an IAQ event based on a sensed property of the environment 18 rising above a threshold level, such as when a density of particulate matter or volatile organic compounds in the environment 18 increases. Other properties that can signal an IAQ event are contemplated by the present disclosure and as discussed further herein below.

The IAQ event detector 14 includes at least one sensor. In one embodiment, the IAQ event detector 14 includes a plurality of sensors 22, 24, 26 for monitoring the environment 18 as depicted in FIG. 1. In this illustrative embodiment, the IAQ event detector 14 includes an infrared (IR) sensor 22, an air pollutant sensor 24, and a humidity/temperature sensor 26. The IR sensor 22 monitors a temperature of the cook top 16 to establish an ambient baseline and to detect changes in the temperature of the cook top 16 as operation of the cook top 16 is likely to introduce pollutants into the environment 18. The air pollutant sensor 24 is configured to detect a concentration of one or more air pollutants in the environment 18, such as, but not limited to, CO, $CO_2$, NO, $NO_2$, NOX, PM2.5, ultrafine particles, smoke (PM2.5 and PM10), radon, molds and allergens (PM10), Volatile Organic Compounds (VOCs), ozone, dust particulates, lead particles, Acrolein, and/or formaldehyde. The humidity/temperature sensor 26 measures the temperature and/or humidity in the environment 18 at the IAQ event detector 14 to establish an ambient baseline and to detect changes in the conditions of the environment 18. In some embodiments, more or less sensors are used in the IAQ event detector 14. In some embodiments, other characteristics of the environment 18 and inputs are used for IAQ event detection, such as, but not limited to, temperature (ambient and object, infrared), relative humidity, time of day, motion detection, and inputs from other sensors or systems. For example, operation of the cook top 16 by a user can provide a direct signal to operate the ventilation fan 12 regardless of output from the IAQ event detector 14. In some embodiments, additional or alternative sensors are used in IAQ event detector 14. For example, one or more temperature sensors, such as a thermally actuated switch (e.g., a bimetal disc thermostat) or thermistor, can be arranged to detect a temperate at the ventilation fan 12 and operate and/or change a speed of the ventilation fan 12 in response to the detected temperature at the ventilation fan 12 being above a threshold temperature. The temperature sensors may be in the form of mechanical thermal switches. Different combinations of sensors can also be used to adjust for complexity and cost for use in different systems.

Figure 2:
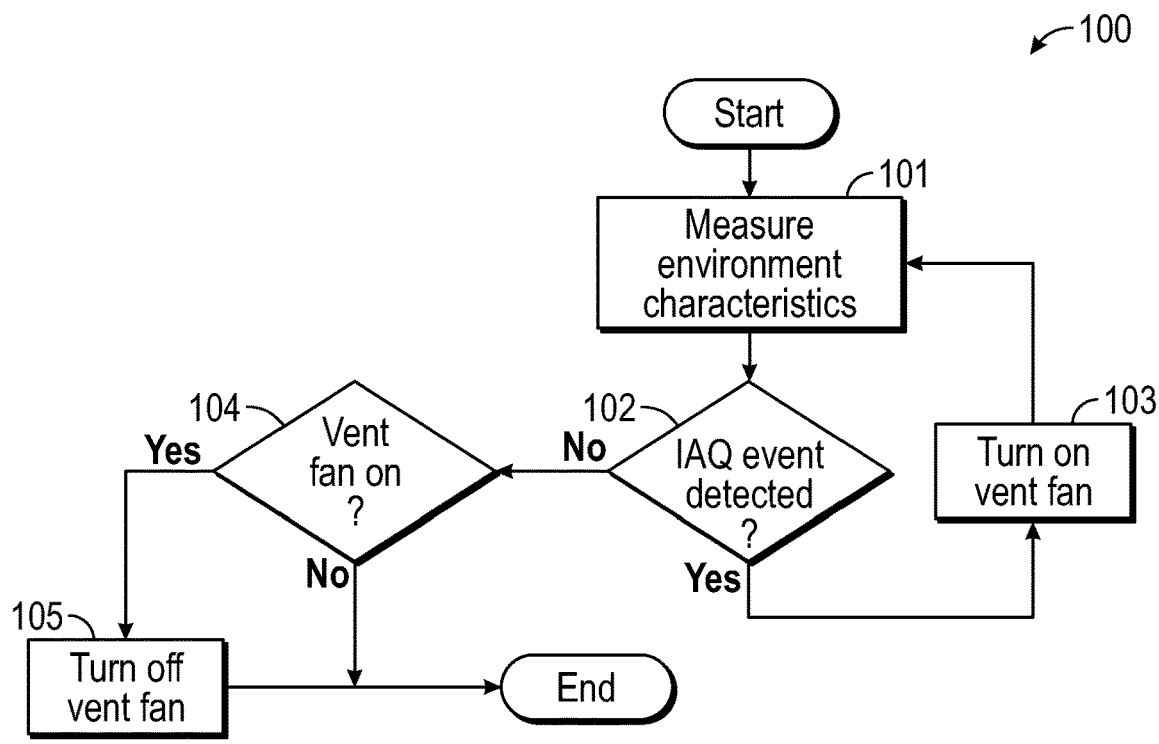
FIG. 2 is a diagrammatic view of an illustrative process for operating the venting system of FIG. 1.

One illustrative process 100 for operating the venting systems of the present disclosure, including venting system 10, is shown in FIG. 2. The process 100 starts with a measurement operation 101 where the IAQ event detector 14 measures characteristics of the environment 18. A detection operation 102 uses the measurements taken in the operation 101 to determine if an IAQ event has begun in the environment 18. If an IAQ event is detected, a venting operation 103 is conducted to condition the air in the environment 18 by operating the ventilation fan 12. The measurement operation 101 and the detection operation 102 are run again to determine if the IAQ event has concluded. If no IAQ event is detected, a fan status check 104 is conducted and, if it is determined that the ventilation fan 12 is on, the ventilation fan 12 is turned off at operation 105 and the process 100 concludes. In some embodiments, the process 100 is run in a continuous loop where the output of the operations 104, 105 are directed back to the measurement operation 101.

In some embodiments, the IAQ event detector 14 includes a temperature sensor 26, such as a thermally actuated switch or thermistor, and the ventilation fan 12 is operated (such as at a high speed setting) in response to a measured temperature at the ventilation fan 12 rising above a threshold level indicating an IAQ event. In some embodiments, the IAQ event detector 14 includes one or more temperature sensors 26, and the ventilation fan 12 can be operated at a first setting (such as at a low speed setting) in response to a measured temperature at the ventilation fan 12 rising above a first threshold level, a second setting (such as at a medium speed setting) in response to a measured temperature at the ventilation fan 12 rising above a higher second threshold level, and a third setting (such as at a high speed setting) in response to a measured temperature at the ventilation fan 12 rising above a higher third threshold level. In some embodiments, the IAQ event detector 14 includes two or more temperature sensors 26 located in different positions around the ventilation fan 12, and the ventilation fan 12 can be operated (such as at a high speed setting) in response to a difference between the measured temperatures of the two or more sensors 26 rising above a threshold level. In some embodiments, the IAQ event detector 14 includes an infrared (IR) sensor 22 having a field of view directed into the environment 18, such as toward the cook top 16, and the ventilation fan 12 is operated (such as at a high speed setting) in response to a measured temperature of an object in the field of view of the IR sensor 22, such as the cook top 16, rising above a threshold level indicating an IAQ event. In some embodiments, the IAQ event detector 14 includes an infrared (IR) sensor 22, and the ventilation fan 12 is operated in one or more settings (such as at a low, medium, and/or high speed setting) in response to a measured temperature of an object in the field of view of the IR sensor 22, such as a cook top 16, rising above one or more threshold levels indicating an IAQ event. In some embodiments, the IAQ event detector 14 includes an air pollutant sensor 24, and the ventilation fan 12 is operated in one or more settings (such as at a low, medium, and/or high speed setting) in response to a measured level of pollutants, such as volatile organic compounds, rising above a threshold level indicating an IAQ event. In some embodiments, the IAQ event detector 14 includes a humidity sensor 26, and the ventilation fan 12 is operated in one or more settings (such as at a low, medium, and/or high speed setting) in response to a measured level of humidity rising above a threshold level indicating an IAQ event.

In some embodiments, the IAQ event detector 14 includes various combinations of sensors described herein, and the ventilation fan 12 is operated in one or more settings (such as at a low, medium, and/or high speed setting) in response to the measured values of the sensors. For example, in one embodiment, the IAQ event detector 14 can include an ambient temperature sensor 26, such as a thermally actuated switch or thermistor, configured to measure a temperature at the ventilation fan. In another embodiment, the IAQ event detector 14 can include an ambient temperature sensor 26 configured to measure a temperature at the ventilation fan and an IR sensor 22 configured to measure a temperature of one or more objects in a field of view of the IR sensor 22, such as a cook top 16. In another embodiment, the IAQ event detector 14 can include an ambient temperature sensor 26 configured to measure a temperature at the ventilation fan, an IR sensor 22 configured to measure a temperature of one or more objects in a field of view of the IR sensor 22, such as a cook top 16, and an air pollutant sensor 24 configured to measure the levels of one or more pollutants, such as volatile organic compounds. In another embodiment, the IAQ event detector 14 can include an ambient temperature sensor 26 configured to measure a temperature at the ventilation fan, an IR sensor 22 configured to measure a temperature of one or more objects in a field of view of the IR sensor, such as a cook top 16, an air pollutant sensor 24 configured to measure the levels of one or more pollutants, such as volatile organic compounds, and a humidity sensor 26 configured to measure a level of humidity.

Figure 3A:
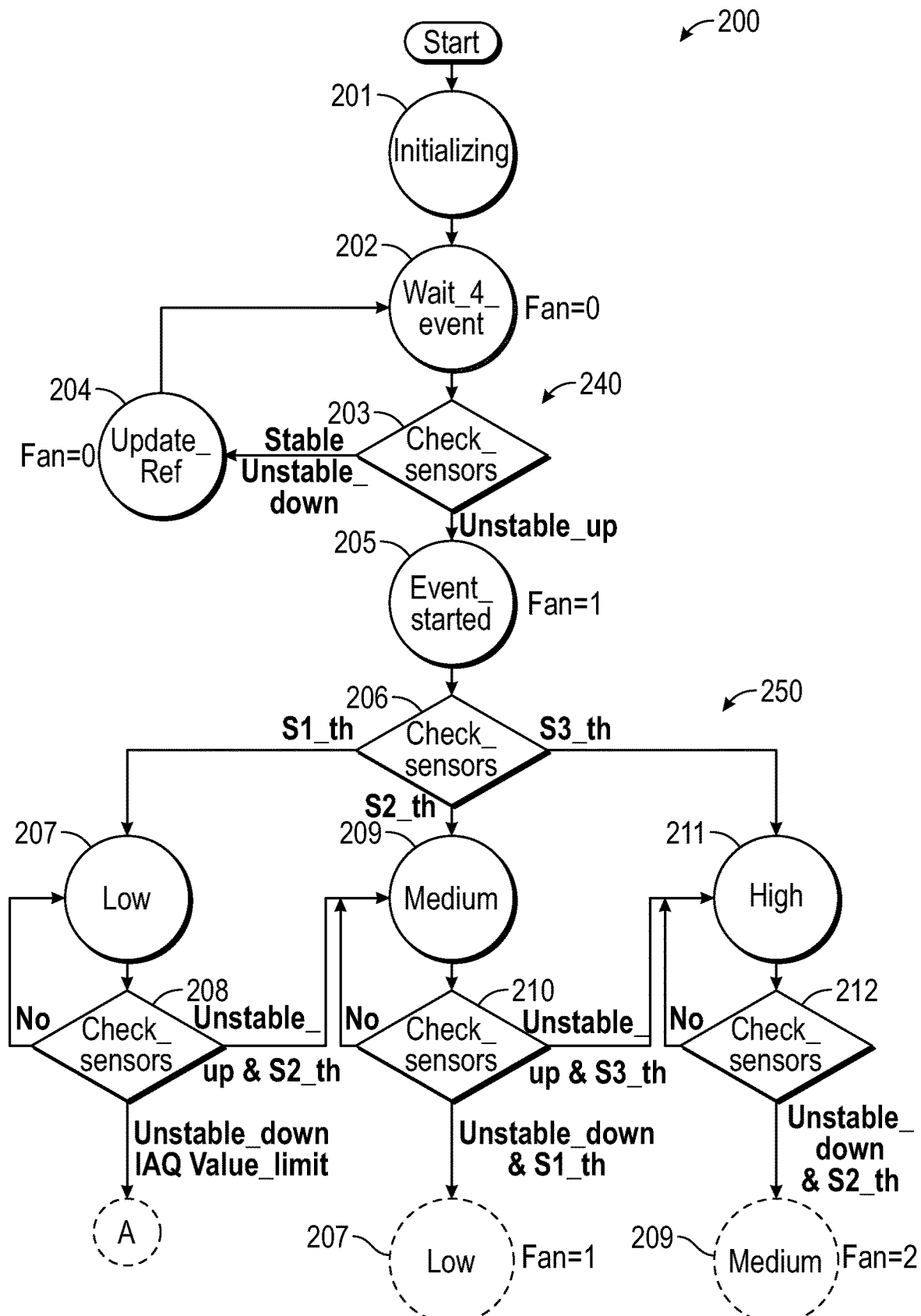
FIGS. 3A-3B are diagrammatic views of another illustrative process for operating the venting systems of the present disclosure.
Figure 3B:
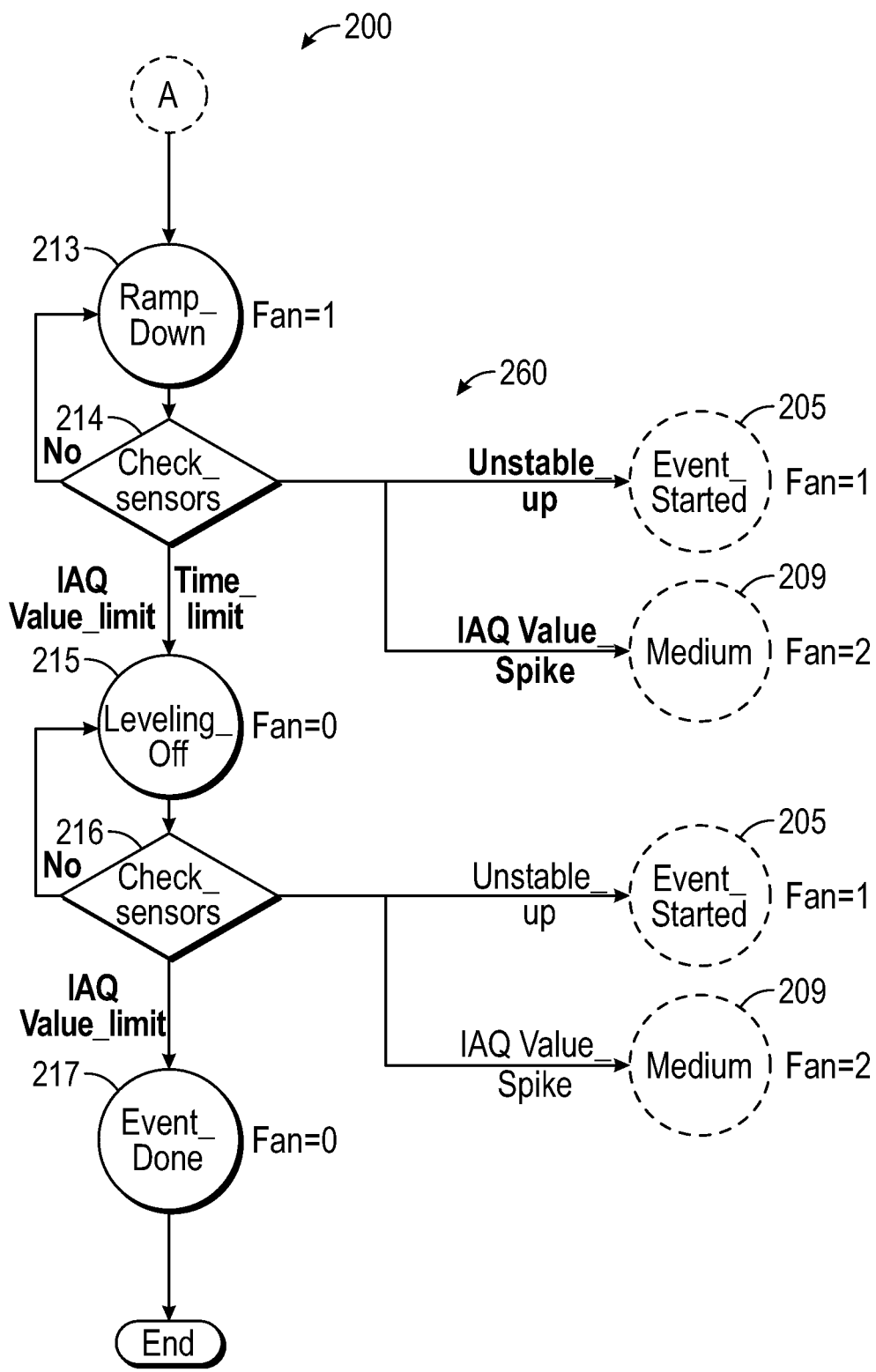

Another illustrative process 200 for operating the venting systems of the present disclosure is shown in FIGS. 3A-3B. The process 200 starts with an initializing operation 201 where ambient conditions of the environment 18 are measured with the IAQ event detector 14 as suggested in FIG. 3A. After initializing, an event detection cycle 240 runs to determine if an IAQ event has begun. In the illustrative embodiment, the event detection cycle 240 includes operations 202, 203, 204. A waiting operation 202 provides a delay between measurements by the IAQ event detector 14 for detecting changes from the previously measured ambient conditions in the environment 18. A sensor check operation 203 measures characteristics of the environment 18 (such as temperature at the ventilation fan 12, temperature at the cook top 16, humidity, and pollutant levels) from the sensors 22, 24, 26 of the IAQ event detector 14 and determines if a change from the ambient conditions is observed. If the measurements are stable or unstable in a downward trend (i.e., less likely to indicate an IAQ event), a reference update operation 204 is conducted to establish a new ambient baseline and the waiting operation 202 is then again conducted. In some embodiments, measurements of the operation 203 are stable relative to the ambient conditions if they are below a threshold percentage change from ambient and/or below a lower threshold level. In some embodiments, the determination of the operation 203 can be based on a relative percentage comparison, a comparison to a threshold level, or a comparison of a rate of change to a threshold rate of change from ambient conditions in the indoor environment.

If measurements from the operation 203 indicate an unstable upward trend compared to the ambient conditions, an IAQ event is detected and the ventilation fan 12 is turned on to a low level (1) at operation 205 as suggested in FIG. 3A. In some embodiments, an unstable upward reading in the operation 203 from the air pollutant sensor 24 alone does not indicate an IAQ event has started in order to minimize false-positive operation of the ventilation fan 12 by insubstantial quantities of air pollutants. In some embodiments, a reference marker is included in the event detection cycle 240 to indicate the number of cycles where the reading of the air pollution sensor 24 in the operation 203 is unstable upward, and an IAQ event is indicated after a threshold number of cycles. In some embodiments, an unstable upward reading from the IR sensor 22 in the operation 203 alone indicates that the cook top 16 is being operated and an IAQ event is detected.

After an IAQ event is detected in the operation 205, a conditioning cycle 250 begins to condition the air in the environment 18 as suggested in FIG. 3A. Conditioning cycle 250 includes determining the required operating speed for the ventilation fan 12 to effectively address the IAQ event in an energy efficient manner. For example, some IAQ events require the ventilation fan 12 to operate at a high speed (3) to clear large quantities of smoke. In another example, boiling water on the cook top 16 produces a small increase in humidity that can be compensated by the ventilation fan 12 running at the low speed (1).

In the illustrative embodiment, the conditioning cycle 250 starts with a sensor check operation 206 for initially determining the proper speed for the ventilation fan 12 as suggested in FIG. 3A. A determination to operate in a first scenario (S1_th) is made based on both the air pollutant reading and humidity reading being below a lower threshold level, and ventilation fan 12 can run at a low setting (1) in operation 207. A determination to operate in a third scenario (S3_th) is made based on either one, or both, of the air pollutant reading and humidity reading being above an upper threshold level, and the ventilation fan 12 can run at a high setting (3) in operation 209. A determination to operate in a second scenario (S2_th) is made where neither of the first or third scenarios applies, and the ventilation fan 12 can run at a medium setting (2) in operation 211. Additional sensor checks are conducted at operations 208, 210, 212 to determine if the conditions in the environment 18 have changed requiring a higher or lower setting of the ventilation fan 12 as part of the conditioning cycle 250. Other scenarios are contemplated by the present disclosure based on varying combinations of the measured conditions in the environment 18. In some embodiments, each of the operations 207, 209, 211 can include a waiting operation to provide a delay between measurement the operations 208, 210, 212 for detecting changes from the previously measured conditions in the environment 18. In some embodiments, various delays can be built into the process 200 to avoid rapid changes in the operating speed of the ventilation fan 12 so as not to draw attention to the ventilation fan 12 and distract a user from the cook top 16.

The conditioning cycle 250 operates to drive the conditions in the environment 18 toward the first scenario as suggested in FIG. 3A. As the IAQ event is cleared and the measured conditions in the environment 18 trend downward, a determination is made in the operation 208 to operate a finish cycle 260 as suggested in FIGS. 3A and 3B. The finish cycle 260 begins with a ramp down operation 213 where the ventilation fan 12 is run at the low setting (1) and the conditions in the environment 18 are monitored in operation 214. The conditioning cycle 250 is run again if the measured values trend upward or a spike is indicated (e.g., relative change in measured value is above threshold level) as suggested in FIG. 3B. When the measured values fall below a threshold level (e.g., a relative amount above ambient) or a time limit is reached, a leveling off operation 215 is conducted to turn off the ventilation fan 12. Further monitoring is conducted in operation 216, and the conditioning cycle 250 is run again if the measured values trend upward or a spike is indicated. When the measured values fall below another threshold level (e.g., ambient), it is determined that the IAQ event is done at operation 217 and the process 200 is ended. In some embodiments, the process 200 is run in a continuous loop where the output of the operation 217 is directed back to the initializing operation 201.

Figure 4A:
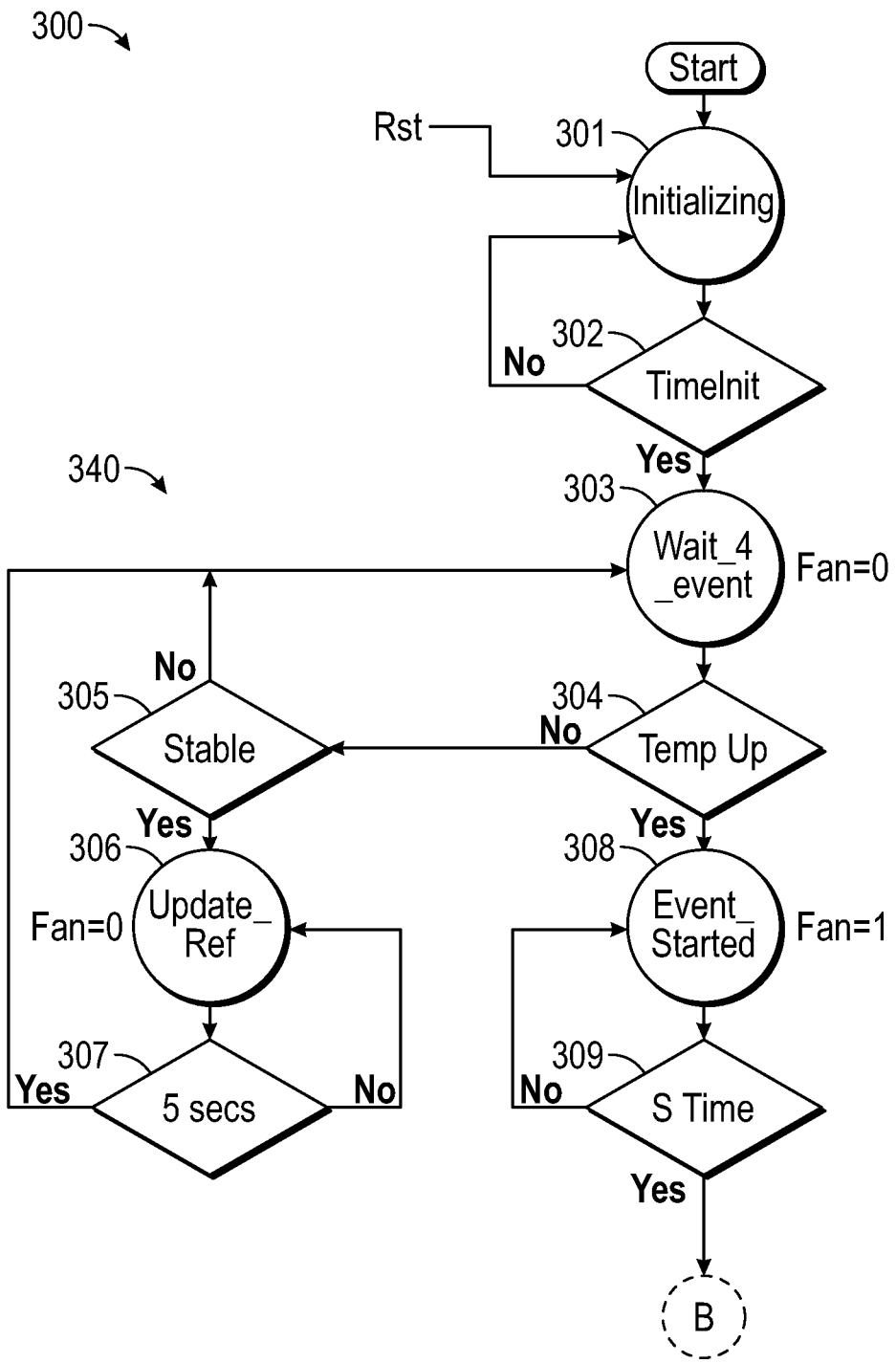
FIGS. 4A-4C are diagrammatic views of another illustrative process for operating the venting systems of the present disclosure.
Figure 4B:
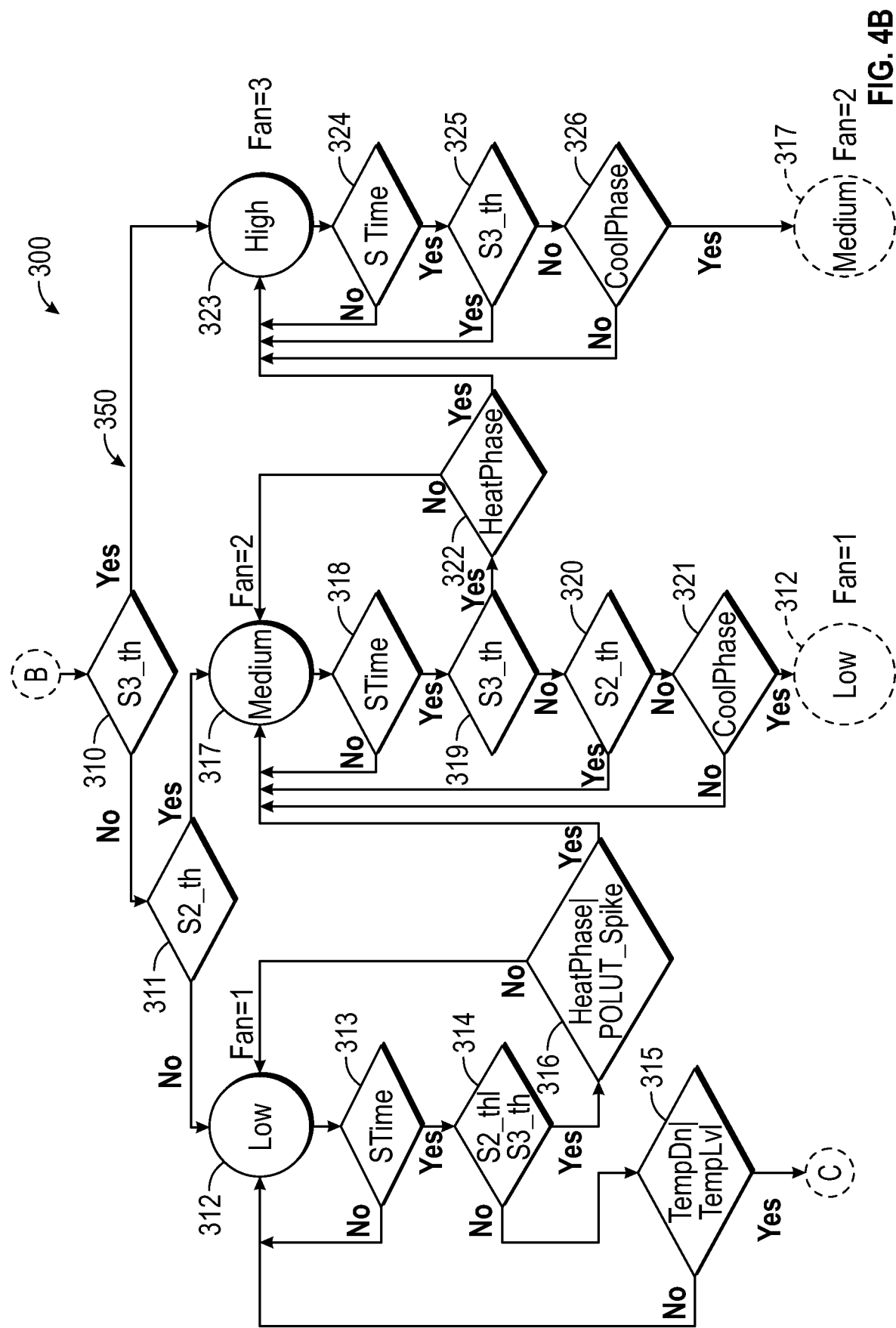
Figure 4C:
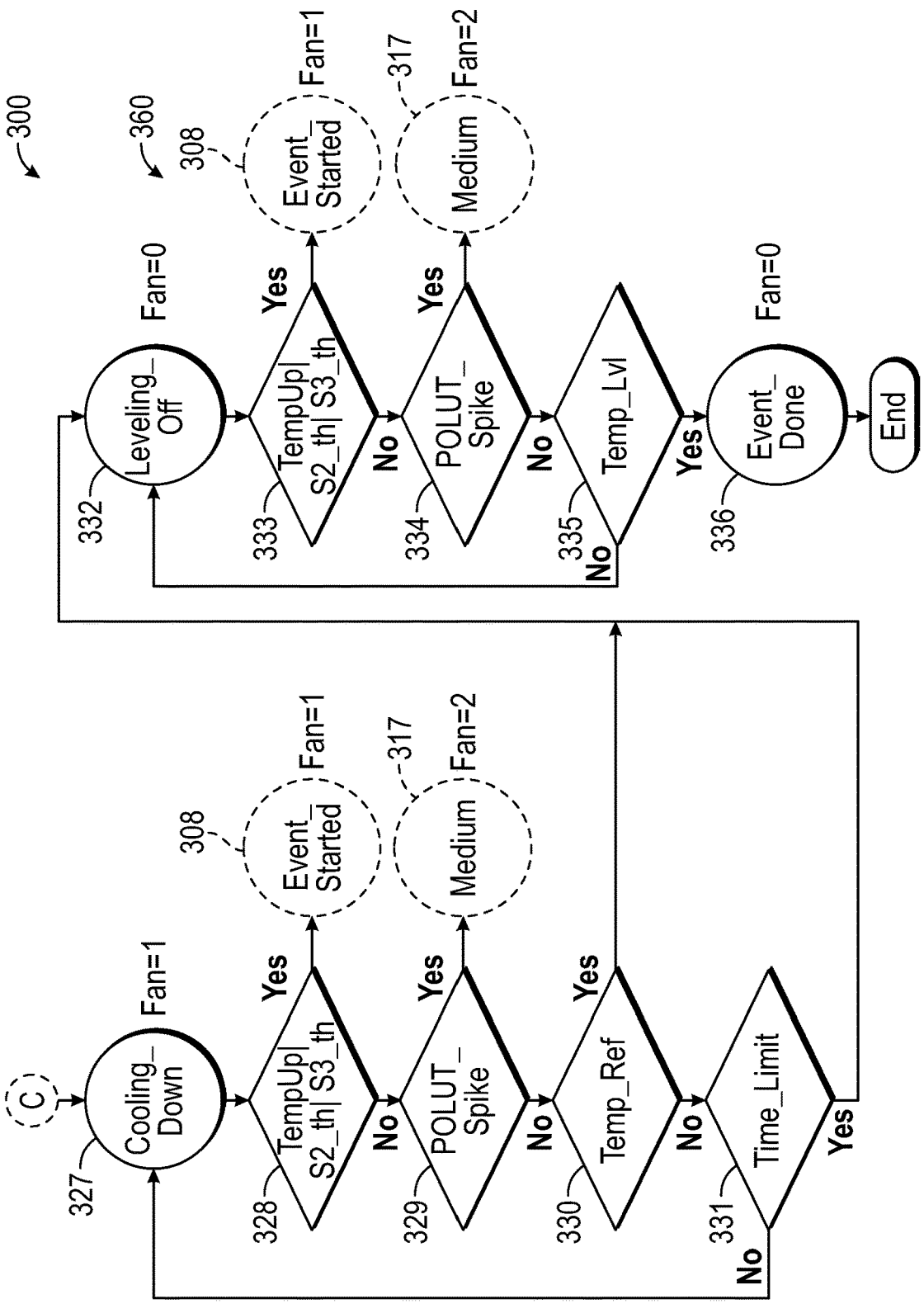

Another illustrative process 300 for operating the venting systems of the present disclosure is shown in FIGS. 4A-4C. The process 300 starts with an initializing operation 301 where ambient conditions of the environment 18 are measured with the IAQ event detector 14 as suggested in FIG. 4A. In the illustrative embodiments, an initialization time count operation 302 is conducted to provide a delay for the IAQ event detector 14 to initialize before beginning an event detection cycle 340.

After the initializing time delay has completed, the event detection cycle 340 runs to determine if an IAQ event has begun as suggested in FIG. 4A. In the illustrative embodiment, the event detection cycle 340 includes operations 303-307. A waiting operation 303 provides a delay between measurements by the IAQ event detector 14 for detecting changes from the previously measured ambient conditions in the environment 18. A temperature check operation 304 measures characteristics of the environment 18 and determines if a change from the ambient conditions is observed. If the measurements are stable or unstable in a downward trend (i.e., less likely to indicate an IAQ event) as determined in an operation 305, a reference update operation 306 is conducted to establish a new ambient baseline. A waiting operation 307 provides a delay for the reference measurement update. Waiting operation 303 is then again conducted. In some embodiments, measurements of the operation 304 are stable relative to the ambient conditions if they are below a threshold percentage change from ambient and/or below a lower threshold level. In some embodiments, the determination of the operation 304 can be based on a relative percentage comparison, such as for an IR sensor 22 reading of the temperature of the cook top 16, or a comparison to a threshold level.

If measurements from operation 304 indicate an unstable upward trend compared to the ambient conditions, an IAQ event is detected and the ventilation fan 12 is turned on to a low level (1) at operation 308 as suggested in FIG. 4A. In the illustrative embodiment, a start time count operation 309 is conducted to provide a delay before beginning a conditioning cycle 350. After the start time delay has completed, the conditioning cycle 350 begins to condition the air in the environment 18 as suggested in FIGS. 4A and 4B. The conditioning cycle 350 includes determining the required operating speed for the ventilation fan 12 to effectively address the IAQ event in an energy efficient manner. For example, some IAQ events require the ventilation fan 12 to operate at a high speed (3) to clear large quantities of smoke. In another example, boiling water on the cook top 16 produces a small increase in humidity that can be compensated by the ventilation fan 12 running at the low speed (1).

In the illustrative embodiment of FIGS. 4A-4C, the conditioning cycle 350 starts with operations 310, 311 for initially determining the proper speed for the ventilation fan 12 as suggested in FIG. 4B. Each of the operations 310, 311 can include a check of the sensors in the IAQ event detector 14. A determination to operate in a first scenario (S1_th) is made based on both the air pollutant reading and humidity reading being below a lower threshold level, and the ventilation fan 12 can run at a low setting (1) in operation 312. A determination to operate in a third scenario (S3_th) is made based on either one, or both, of the air pollutant reading and humidity reading being above an upper threshold level, and the ventilation fan 12 can run at a high setting (3) in operation 323. A determination to operate in a second scenario (S2_th) is made where neither of the first or second scenarios applies, and the ventilation fan 12 can run at a medium setting (2) in operation 317. Start time count operations 313, 318, 325 can be conducted to provide a delay before reevaluating the proper fan level. After the start time delay has completed, additional sensor checks and evaluations are conducted at operations 314-316, 319-322, and 325-326 to determine if the conditions in the environment 18 have changed requiring a higher or lower setting of the ventilation fan 12 as part of the conditioning cycle 350. Other scenarios are contemplated by the present disclosure based on varying combinations of the measured conditions in the environment 18. In some embodiments, each of the operations 312, 317, 323 can include a waiting operation to provide a delay between measurements taken in the operations 314-316, 319-322, and 325-326 for detecting changes from the previously measured conditions in the environment 18. In some embodiments, various delays can be built into the process 300 to avoid rapid changes in the operating speed of the ventilation fan 12 so as not to draw attention to the ventilation fan 12 and distract a user from the cook top 16.

The conditioning cycle 350 operates to drive the conditions in the environment 18 toward the first scenario as suggested in FIG. 4B. As the IAQ event is cleared and the measured conditions in the environment 18 trend downward, a determination is made in the operation 315 to operate a finish cycle 360 as suggested in FIGS. 4B and 4C. The finish cycle 360 begins with a cooling down operation 327 where the ventilation fan 12 is run at the low setting (1) and the conditions in the environment 18 are monitored in operations 328-331 as suggested in FIG. 4C. The conditioning cycle 350 is run again if the measured values trend upward or a spike is indicated (e.g., relative change in measured value is above threshold level). When the measured values fall below a threshold level (e.g., a relative amount above ambient) or a time limit is reached, a leveling off operation 332 is conducted to turn off the ventilation fan 12. Further monitoring is conducted in operation 333-335, and the conditioning cycle 350 is run again if the measured values trend upward or a spike is indicated. When the measured values fall below another threshold level (e.g., ambient), it is determined that the IAQ event is done at operation 336 and the process 300 is ended. In some embodiments, the process 300 is run in a continuous loop where the output of the operation 336 is directed back to the initializing operation 301. In some embodiments, a user can manually reset the process 300 back to the initializing operation 301 as suggested in FIG. 4A.

Figure 5:
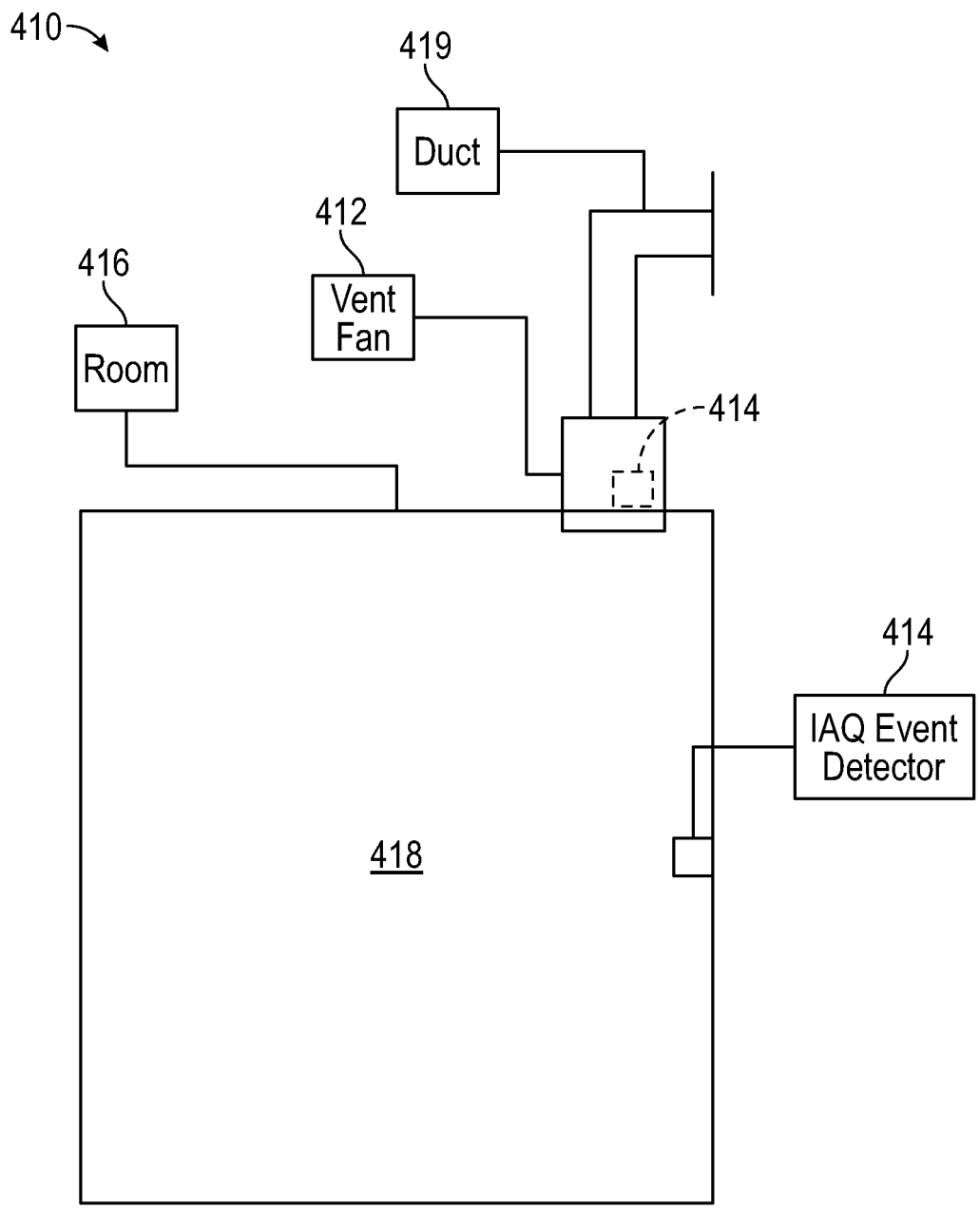
FIG. 5 is a diagrammatic view of another embodiment of venting systems in accordance with the present disclosure.

Another embodiment of a venting system 410 in accordance with the present disclosure is shown in FIG. 5. The venting system 410 includes a ventilation fan 412 and an indoor air quality event detector 414 operatively coupled to the ventilation fan 412 for controlling operation of the ventilation fan 412 as further described herein. In the illustrative embodiment, the ventilation fan 412 is positioned to vent air from a room 416, such as a bathroom for example, through a duct 419, and the IAQ event detector 414 is configured to monitor an environment 418 within the room 416 and selectively operate the ventilation fan 412 to control the air quality in the environment 418. The venting system 410 is a "smart" system in that the ventilation fan 412 is automatically operated and controlled by the IAQ event detector 414 in an energy efficient manner and without requiring user interaction in response to detecting an IAQ event wherein pollutants are being introduced into the indoor air environment 418. In some embodiments, the IAQ event detector 414 can be integrated with the ventilation fan 412 or positioned in another location, such as in a light switch for example, and in communication with the ventilation fan 412, such as through a wired or wireless connection for example, as suggested in FIG. 5. In some embodiments, the IAQ event detector 414 is integrated into a control unit or in communication with a control unit of the ventilation fan 412 used to operate the ventilation fan 412.

The IAQ event detector 414 includes a plurality of sensors, such as an air pollutant sensor and an humidity/temperature sensor similar to that of the IAQ event detector 14 shown in FIG. 1, for monitoring the environment 418 as suggested in FIG. 5. The various sensors are configured to monitor the environment 418 to establish an ambient baseline and to detect changes in the characteristics of the environment 418. Various characteristics of the environment 418 can be monitored and used in operation of venting system 410 as discussed herein with respect to the venting system 10. For example, monitored characteristics of the environment 418 used for IAQ event detection can include, but are not limited to, temperature (ambient and object, infrared), relative humidity, time of day, motion detection, air pollutants, and inputs from other sensors or systems.

Figure 6:
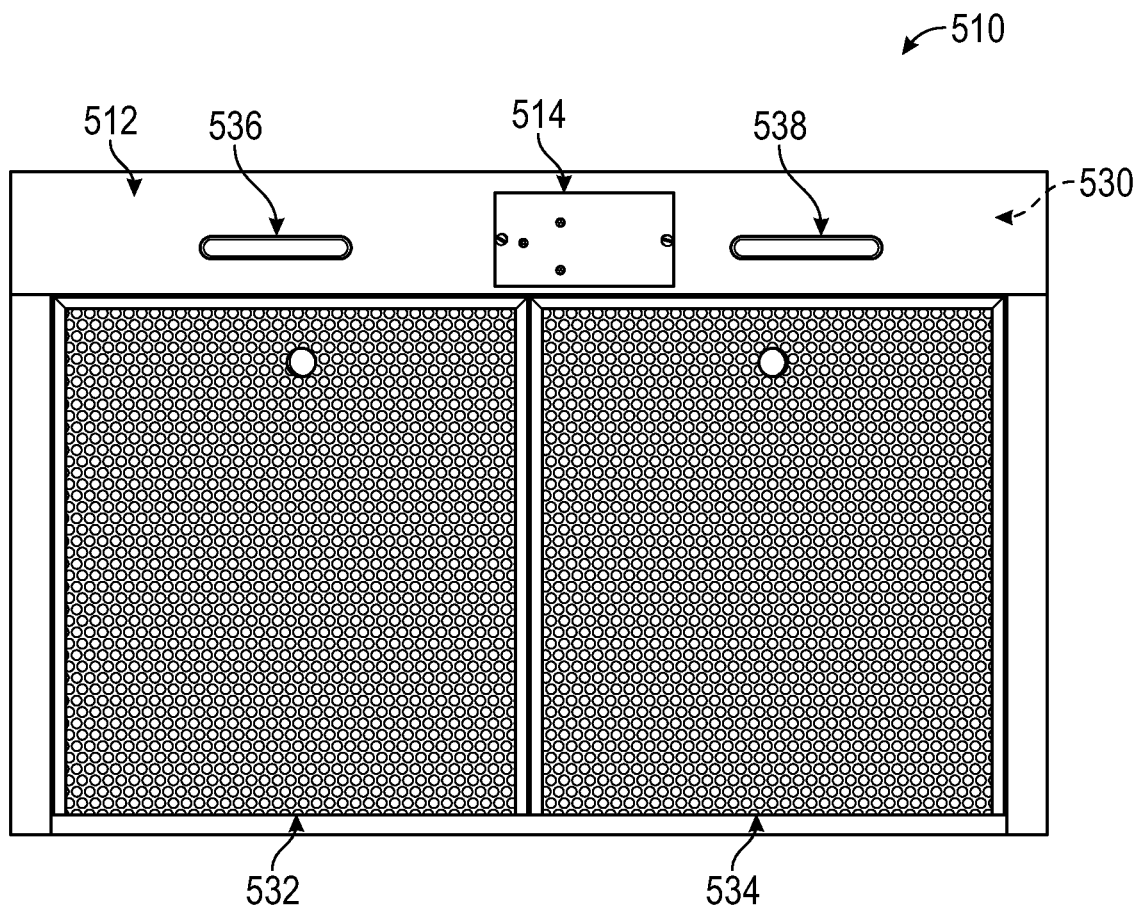
FIGS. 6-11 are various views of another embodiment of an exemplary venting system in accordance with the present disclosure.

Another embodiment of a venting system 510 is shown in FIGS. 6-11. Venting system 510 is similar to venting system 10 of FIGS. 1-5, and includes a ventilation fan 512 and an indoor air quality event detector 514 operatively coupled to the ventilation fan 12 for controlling operation of the ventilation fan 12 as further described herein. In the illustrative embodiment, the ventilation fan 512 includes a control module 530, a pair of fan modules 532, 534, and a pair of light modules 536, 538. The light modules 536, 538 are arranged toward a front of the ventilation fan 512 and the fan modules 532, 534 are arranged toward a rear of the ventilation fan 512 as shown in FIG. 6. The IAQ event detector 514 can be arranged at various locations on the ventilation fan 512, and is illustratively shown in a central, forward location in FIG. 6. In some embodiments, the ventilation fan 512 is arranged to be positioned over a cook top, with the fan modules 532, 534 providing ventilation and the light modules 536, 538 providing light for the cook top.

Figure 7:
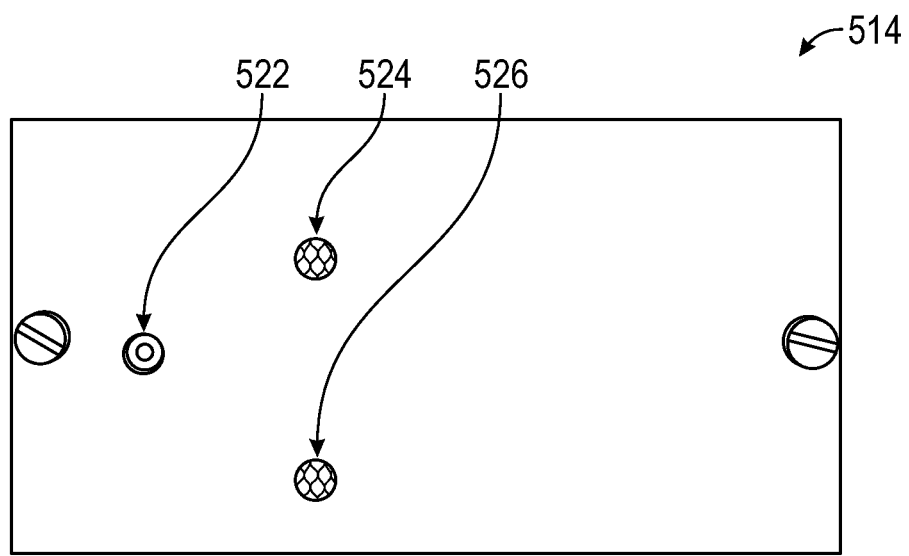
Figure 8:
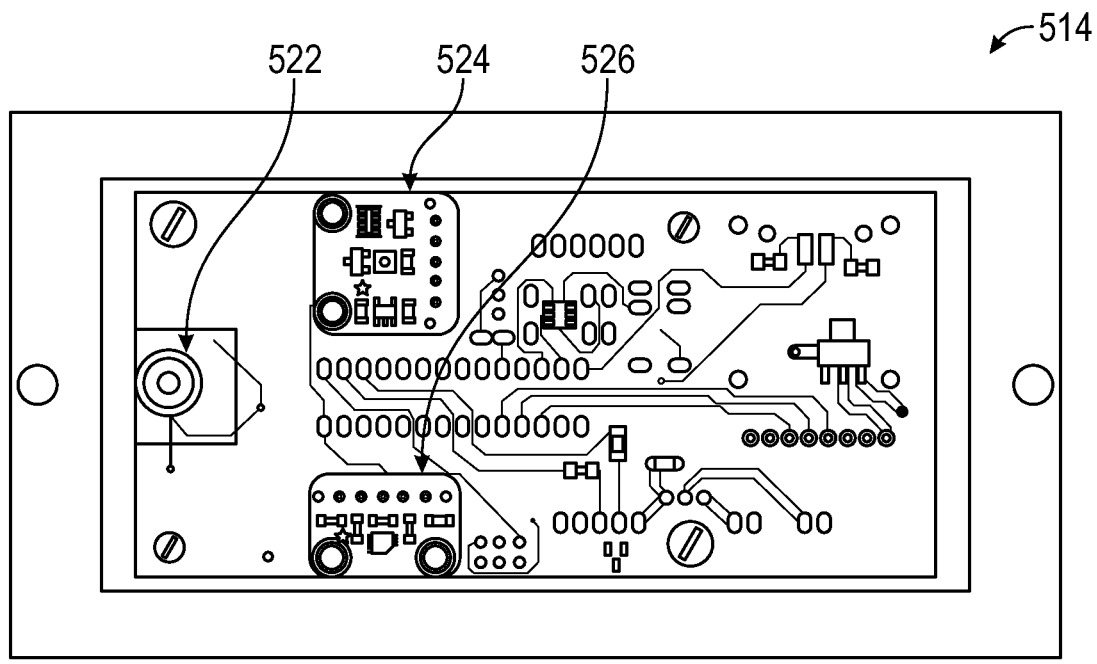

The IAQ event detector 514 is configured to monitor an environment to be conditioned by the venting system 510 and communicate with the control module 530 to selectively operate the ventilation fan 512 for controlling the air quality in the indoor environment. In some embodiments, the IAQ event detector 514 can be integrated with the ventilation fan 512 as shown in FIGS. 6-8. In some embodiments, the IAQ event detector 514 can be integrated into the control module 530.

The venting system 510 is a "smart" system in that the ventilation fan 512 is automatically operated and controlled by the IAQ event detector 514 in an energy efficient manner, and without requiring user interaction, in response to detecting an IAQ event in the environment. In some embodiments, an IAQ event occurs when conditions in the environment become undesirable or are likely to become undesirable without conditioning of the air in the environment by the ventilation fan 512. In some embodiments, the IAQ event detector 514 monitors the environment and detects an IAQ event based on indicators that pollutants are going to be introduced into the indoor air environment, such as when a cook top heats up signaling that smoke and/or excess humidity are likely to be introduced into the environment. In some embodiments, the IAQ event detector 514 monitors the environment and detects an IAQ event based on a sensed property of the environment rising above a threshold level, such as when a density of particulate matter in the environment increases. Other properties that can signal an IAQ event are contemplated by the present disclosure and as discussed further herein below.

The IAQ event detector 514 includes at least one sensor as shown in FIGS. 8-11. In this illustrative embodiment, the IAQ event detector 514 includes an infrared (IR) sensor 522, an air pollutant sensor 524, and a humidity/temperature sensor 526. The IR sensor 522 monitors a temperature of an object in the environment, such as a cook top, for changes in temperature indicating the likely introduction of pollutants into the environment. The air pollutant sensor 524 is configured to detect a concentration of one or more air pollutants in the environment, such as, but not limited to, CO, CO2, NO, NO2, NOX, PM2.5, ultrafine particles, smoke (PM2.5 and PM10), radon, molds and allergens (PM10), Volatile Organic Compounds (VOCs), ozone, dust particulates, lead particles, Acrolein, and formaldehyde. The humidity/temperature sensor 526 measures the temperature and/or humidity in the environment to establish an ambient baseline and to detect changes in the conditions of the environment. In some embodiments, more or less sensors are used in the IAQ event detector 514. In some embodiments, other characteristics of the environment and inputs are used for IAQ event detection, such as, but not limited to, temperature (ambient and object, infrared), relative humidity, time of day, motion detection, and inputs from other sensors or systems. For example, operation of a cook top by a user can provide a direct signal to operate the ventilation fan 512 regardless of output from the IAQ event detector 514. In some embodiments, additional or alternative sensors are used in IAQ event detector 514. For example, one or more temperature sensors, such as a thermally actuated switch or thermistor, can be arranged to detect a temperate at the ventilation fan 512 and operate and/or change a speed of the ventilation fan 512 in response to the detected temperature at the ventilation fan 512 being above a threshold temperature. The temperature sensors may be in the form of mechanical thermal switches. Different combinations of sensors can also be used to adjust for complexity and cost for use in different systems.

Figure 9:
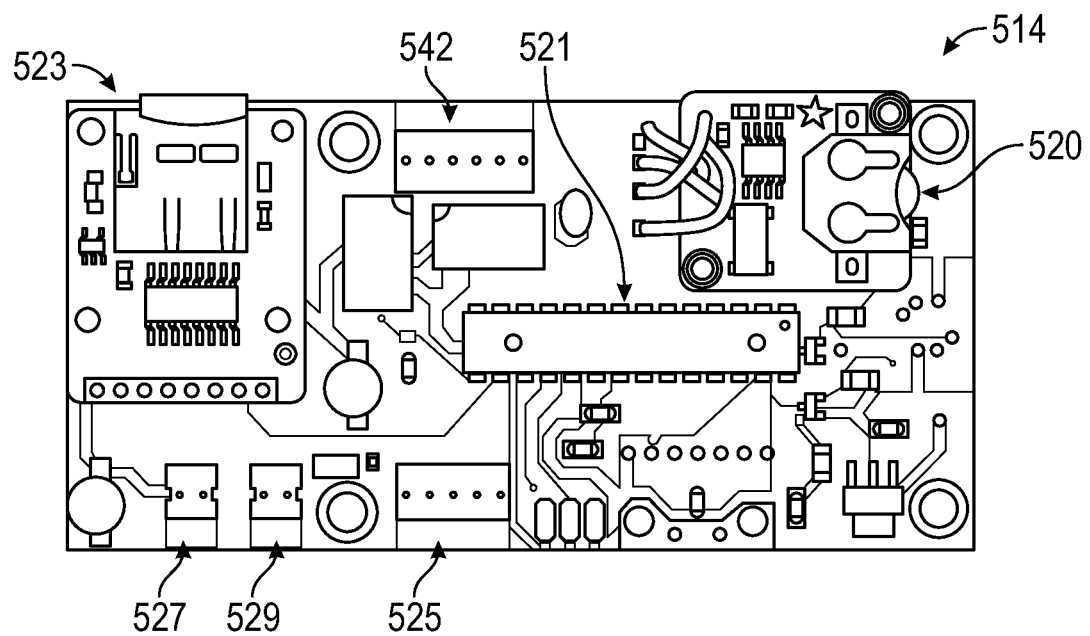
Figure 10A:
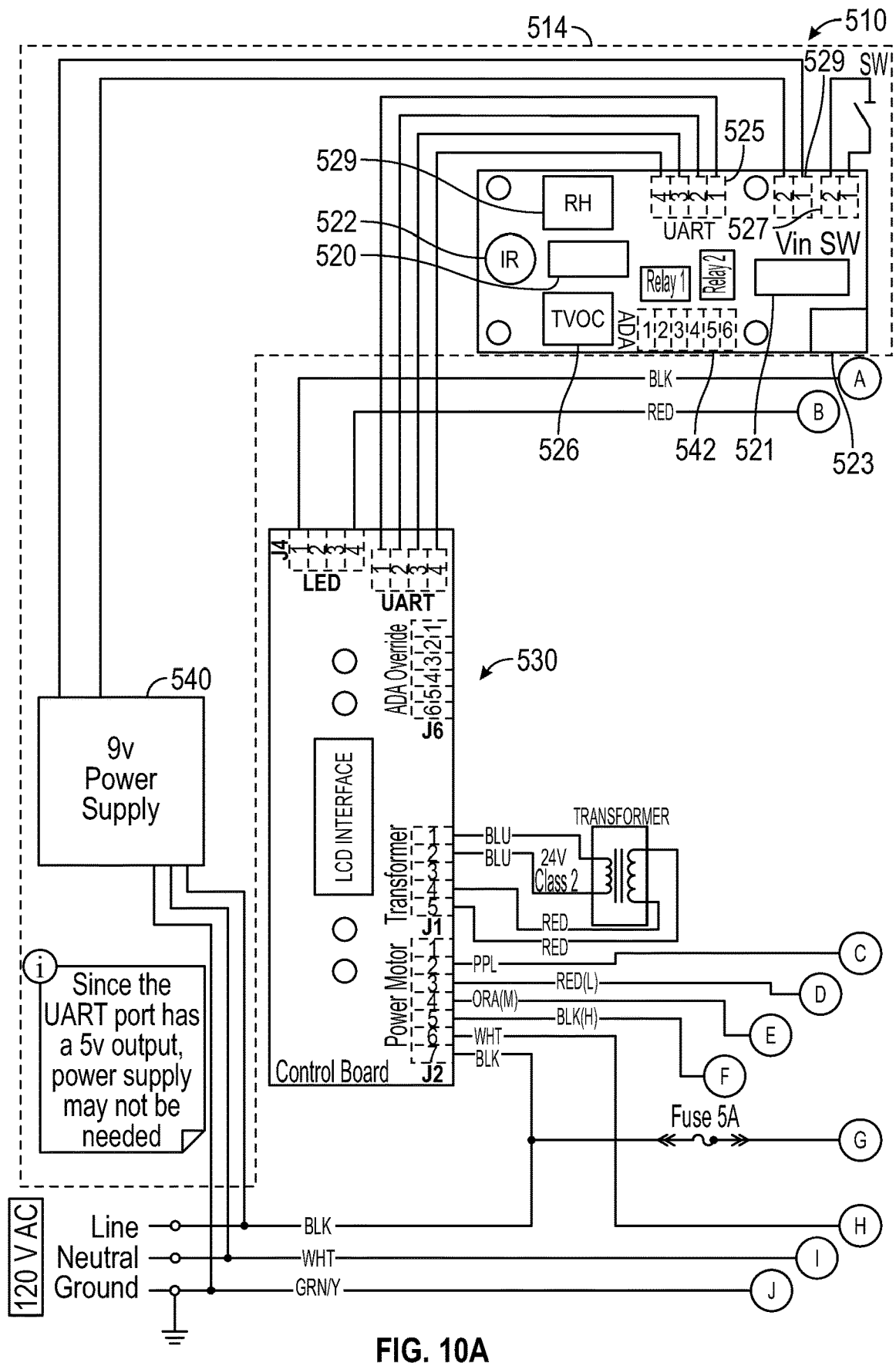
Figure 10B:
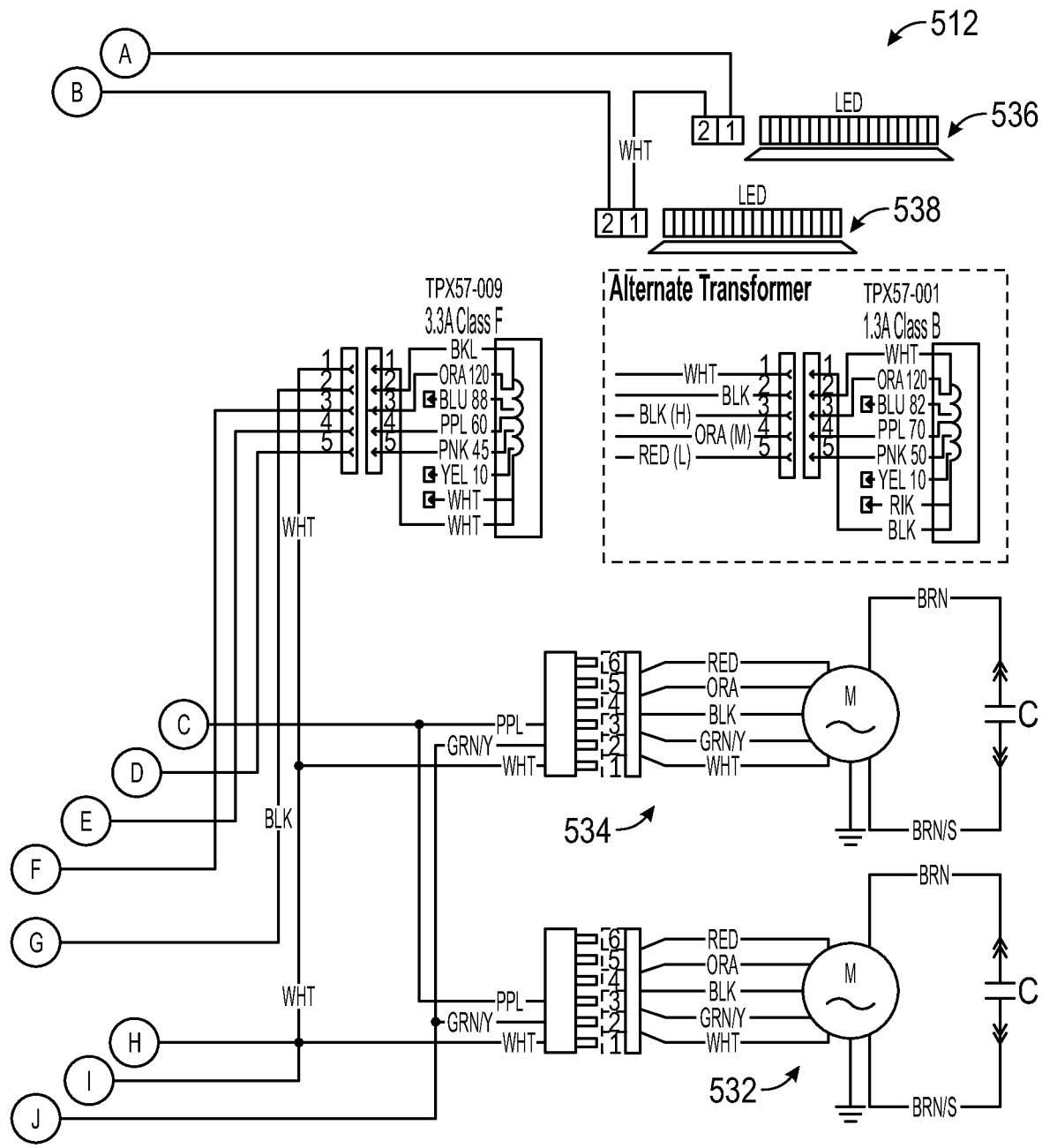
Figure 11A:
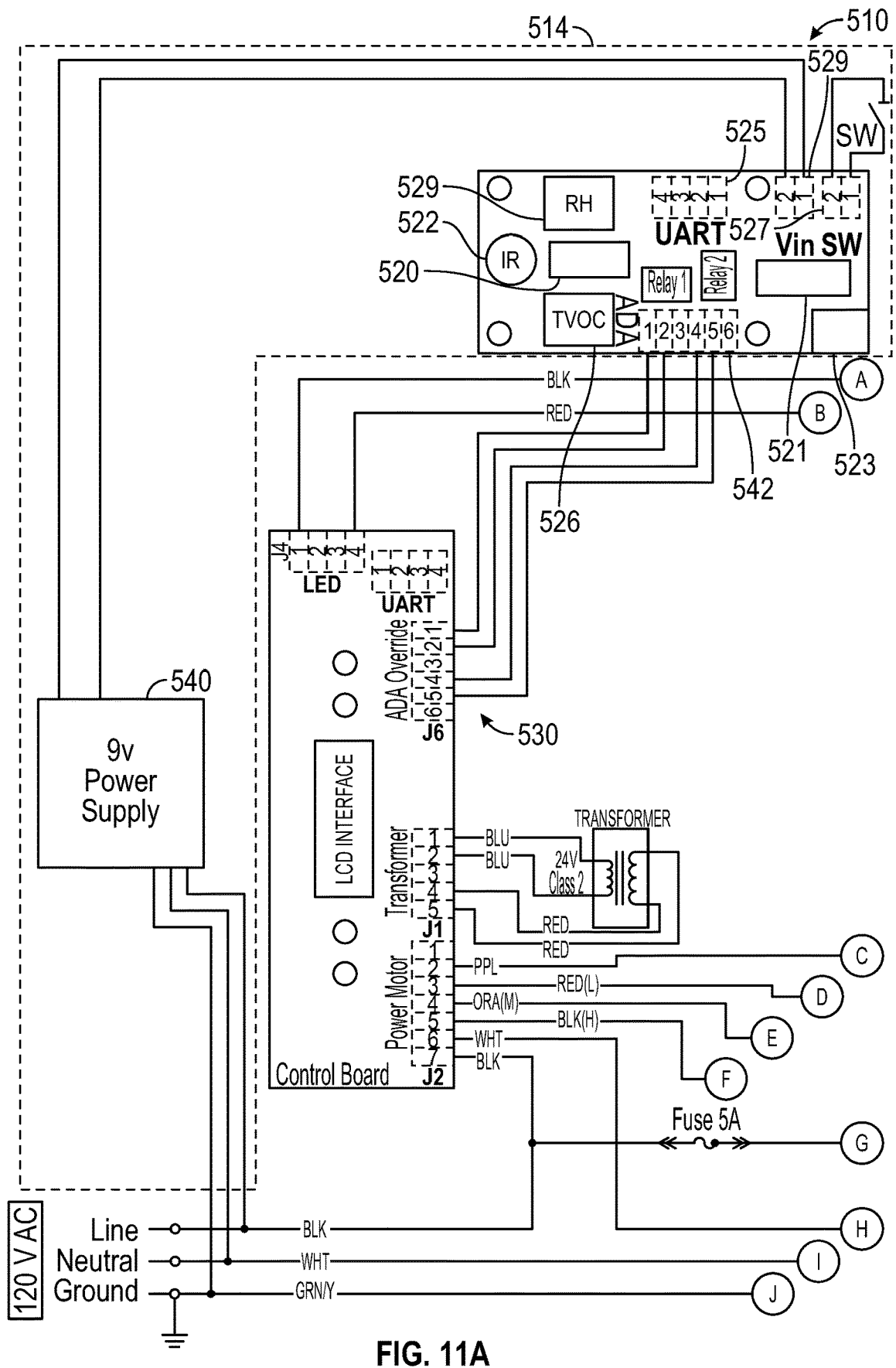
Figure 11B:
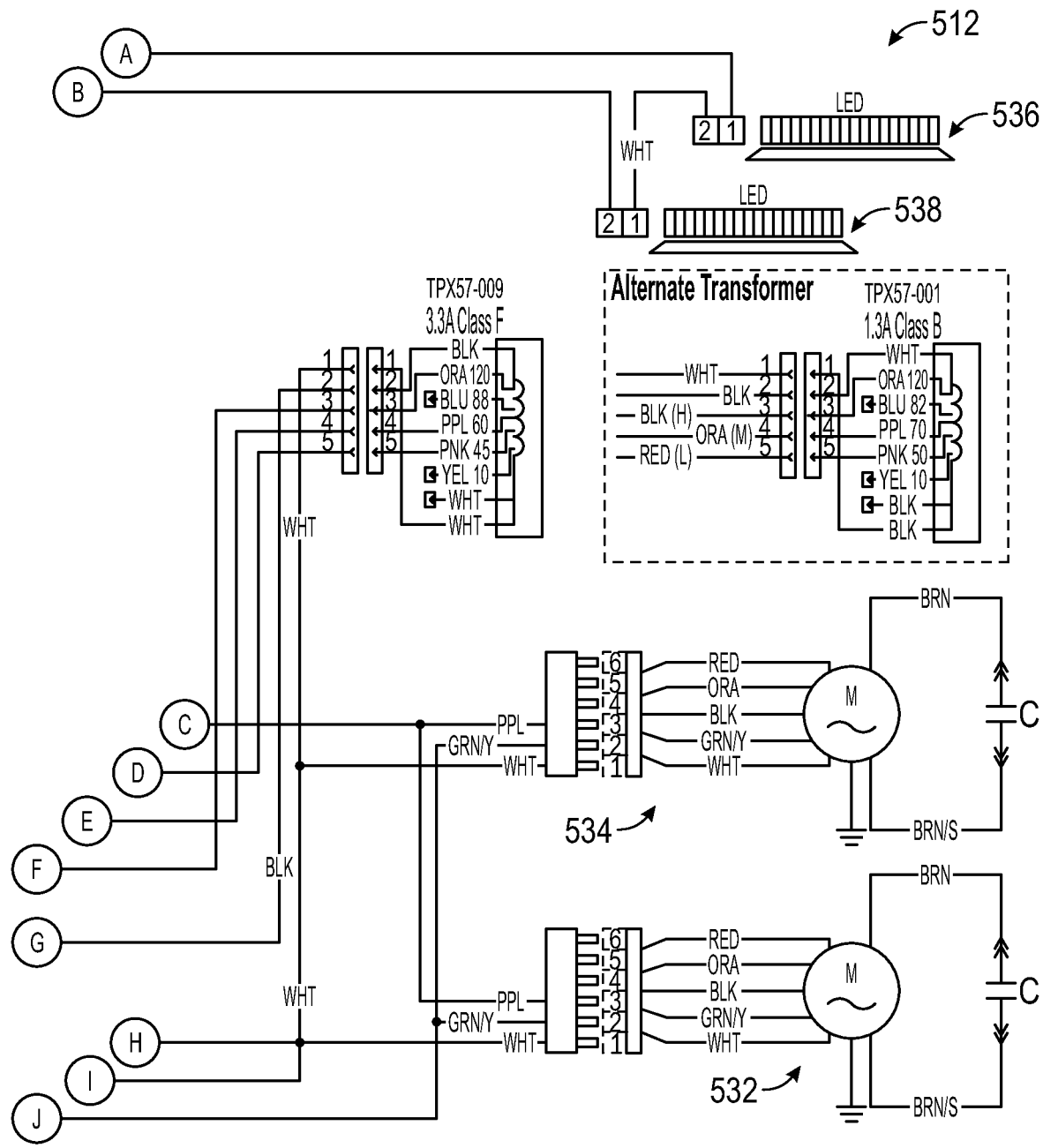

In the illustrative embodiment, the IAQ event detector 514 further includes a controller 521 and a memory 523 as shown in FIGS. 9-11. In some embodiments, a real time clock 520 allows monitoring and recording of the environmental characteristics measured by the sensors 522, 524, 526 over time and/or the operating states of the venting system 10 over time. A port 525, such as a UART port, allows communication between the IAQ event detector 514 and the control module 530 of the ventilation fan 512 as shown in FIG. 10. In some embodiments, a port 542, such as an ADA port, allows communication between the IAQ event detector 514 and the control module 530 of the ventilation fan 512 as shown in FIG. 11. In some embodiments, a switch port 527 provides connection of a switch to the IAQ event detector 514 and allows a user to manually activate or deactivate the IAQ event detector 514. A power port 529 provides connection to a power supply 540 for powering the IAQ event detector 514.

Figure 12:
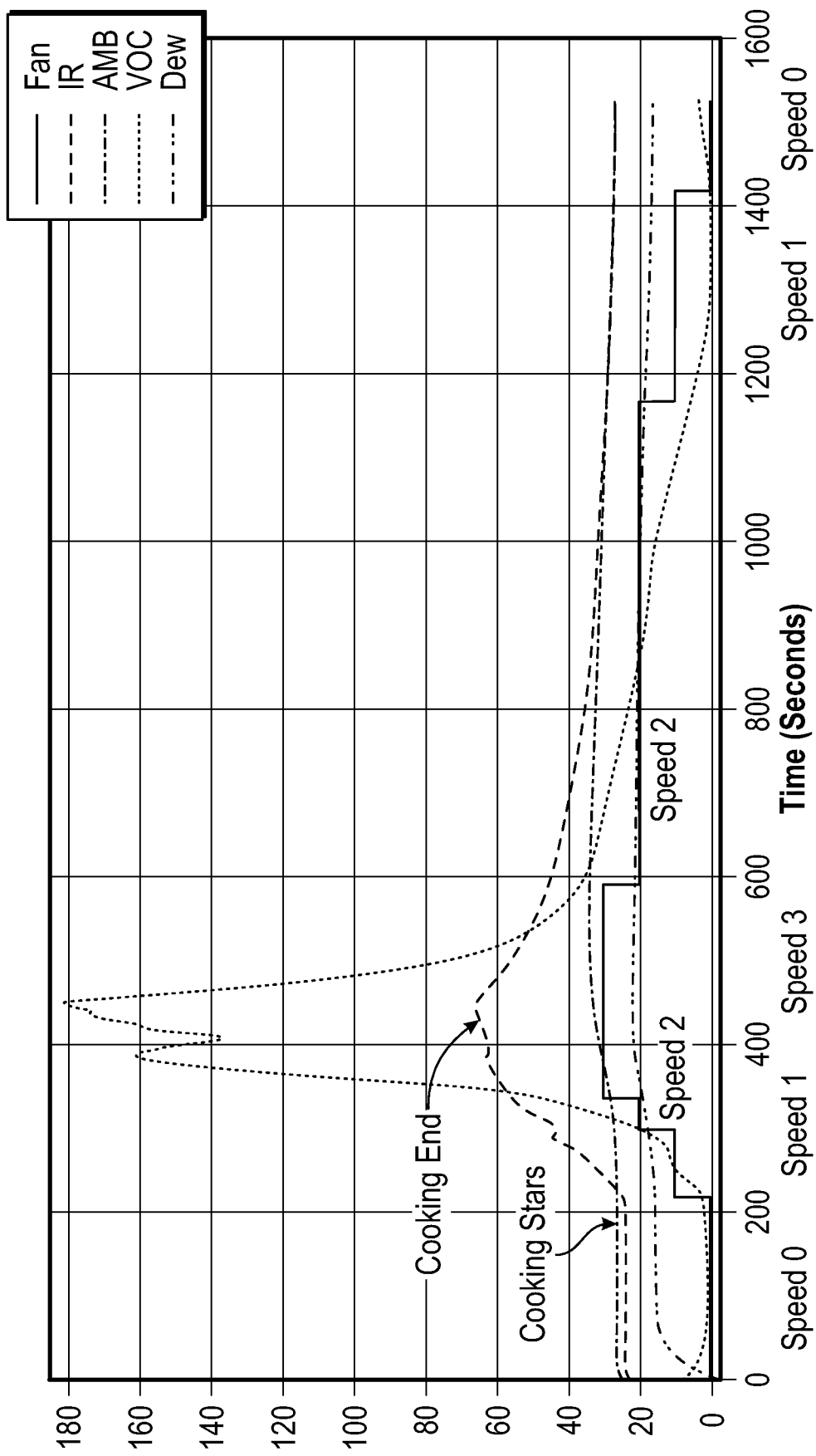
FIGS. 12 and 13 are charts showing operation of the exemplary venting systems in accordance with the present disclosure during an IAQ event.
Figure 13:
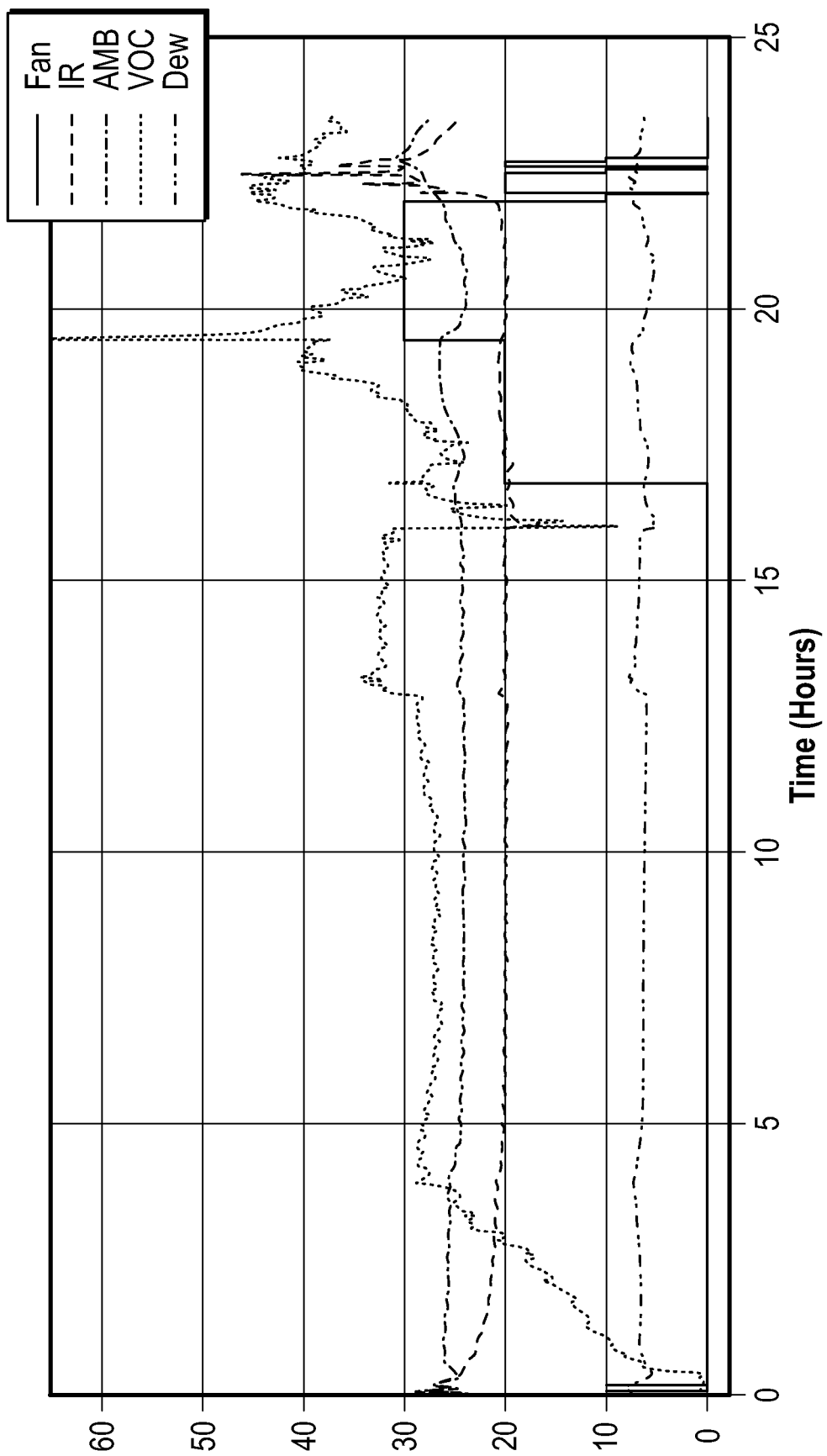
Figure 14:
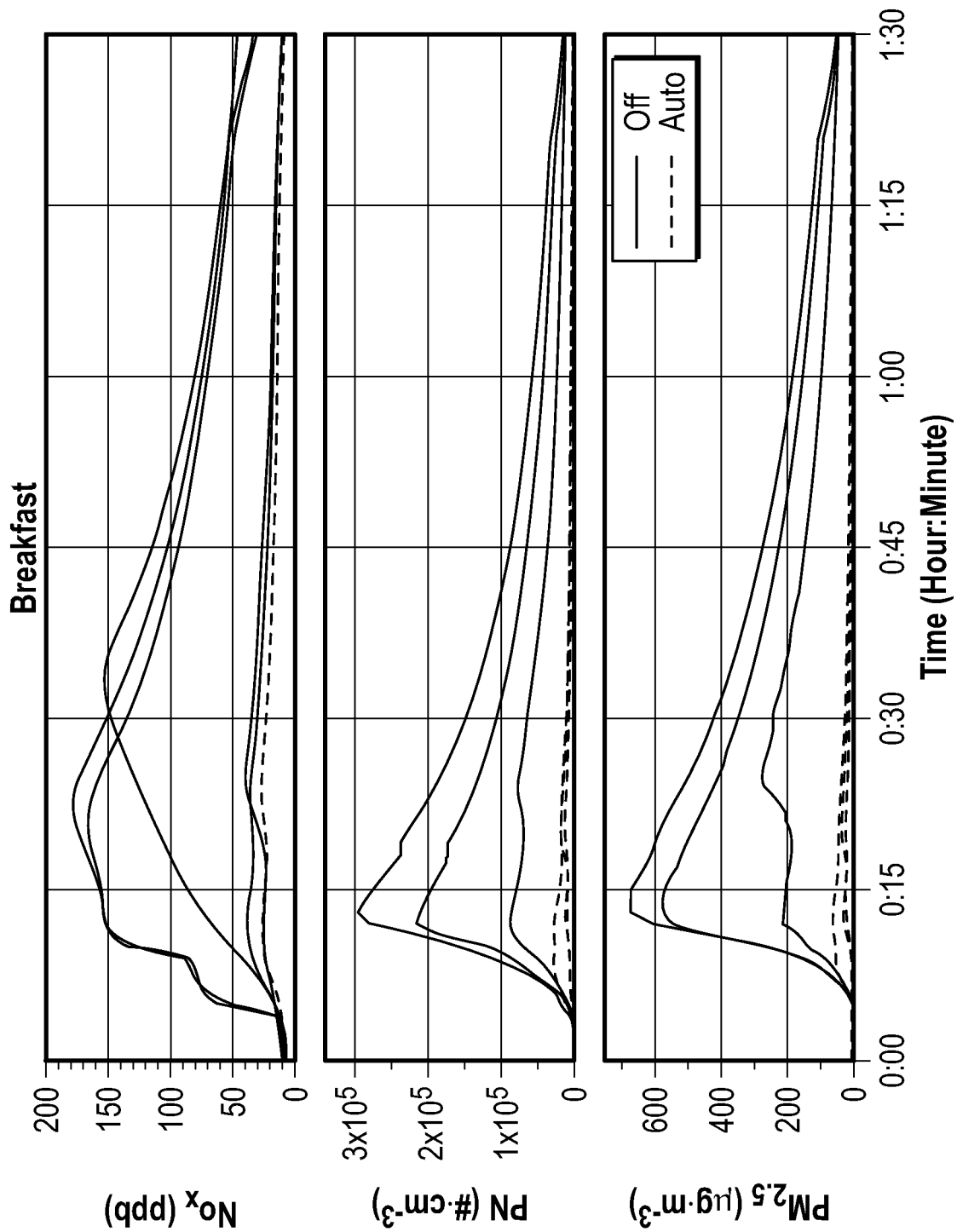
FIGS. 14-16 are charts showing a comparison of the levels in IAQ characteristics during various cooking events with no venting and with venting provided by the exemplary venting systems in accordance with the present disclosure.
Figure 15:
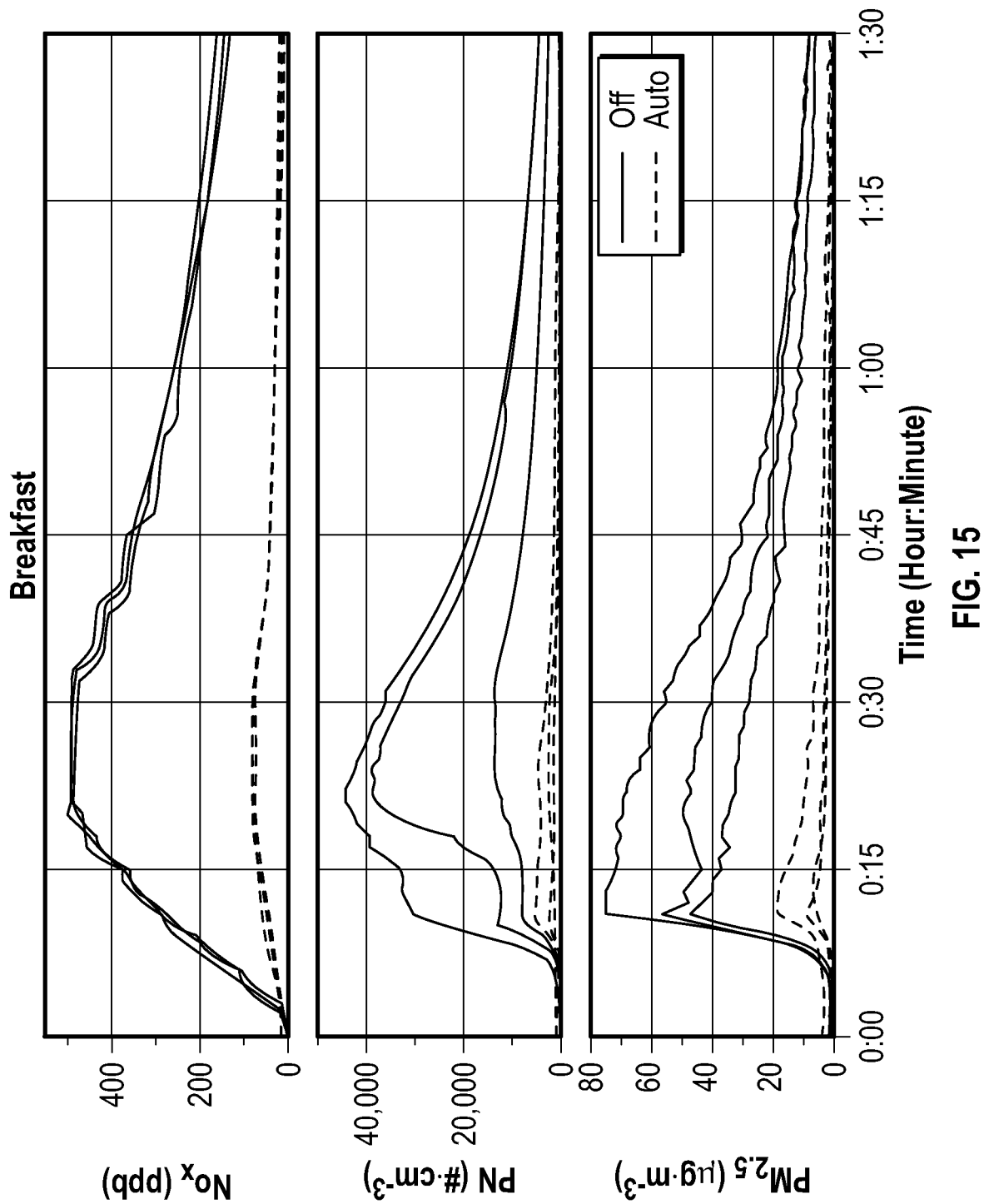
Figure 16:
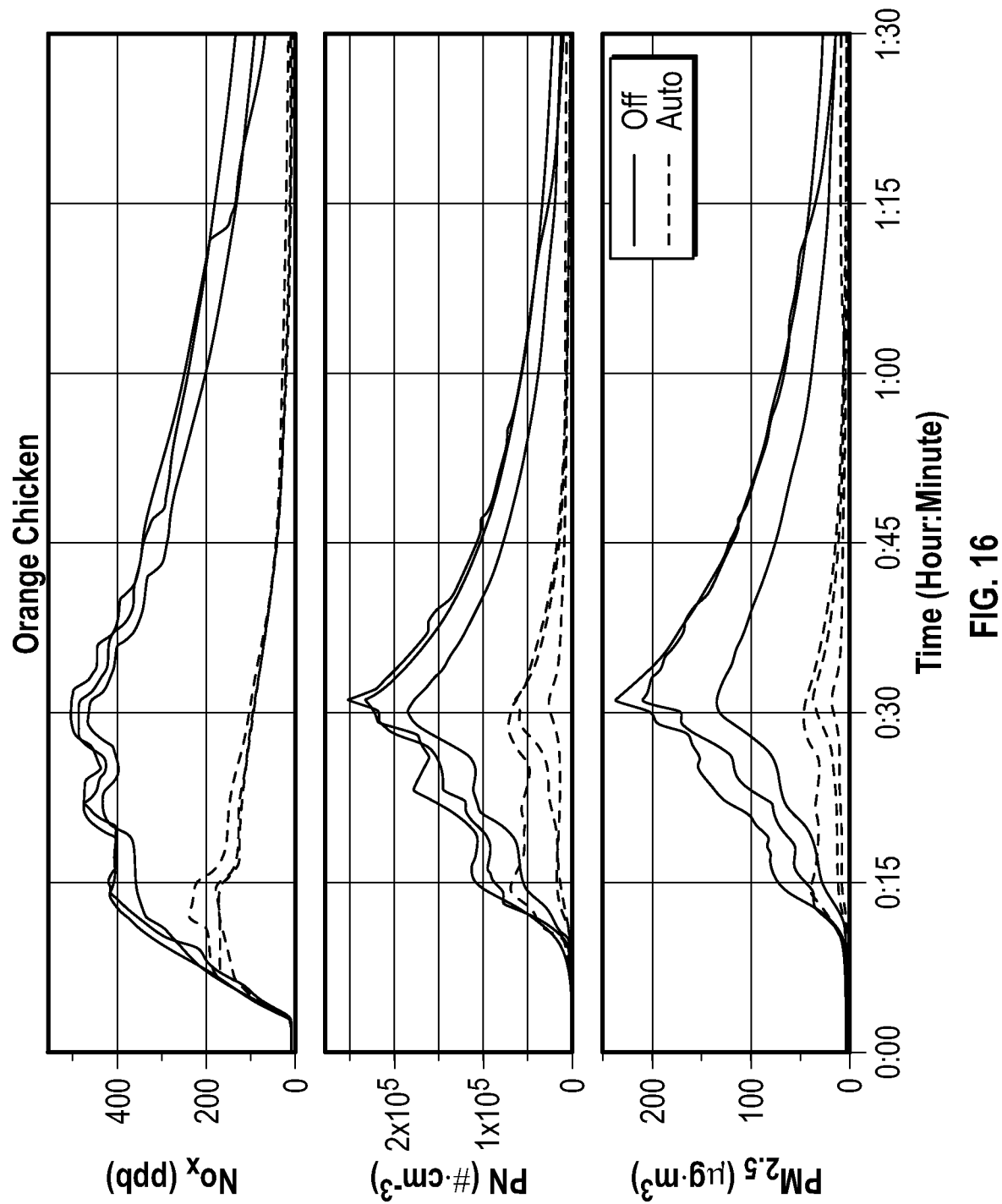

An illustrative chart outlining operation of a venting system in accordance of with the present disclosure during a cooking operation is shown in FIG. 12. As shown in the chart of FIG. 12, the IAQ event detector of the venting system detects that a cooking operation has started and operates the ventilation fan at a first speed. The speed of the ventilation fan is increase as the measure temperature and IAQ characteristics increase. The ventilation fan continues to run until the IAQ event detector measures that the temperature and IAQ characteristics have returned to at or below threshold conditions and/or ambient conditions. The speed of the vent fan gradually decreases as the environment is conditioned and the temperature and IAQ characteristics decrease. FIG. 13 is an illustrative chart detailing operation of a venting system in accordance of with the present disclosure over a 24 hour period. The chart of FIG. 13 shows the changes in environmental conditions and responsive operation of the venting system in response to IAQ events. FIGS. 14-16 are illustrative charts showing a comparison of the levels in IAQ characteristics during various cooking events with no venting and with venting provided by the exemplary venting systems in accordance with the present disclosure. The venting systems of the present disclosure provide significant improvements to IAQ compared to no ventilation, such as when a user fails to engage a venting system that lacks the IAQ event detector of the present disclosure.

Figure 17A:
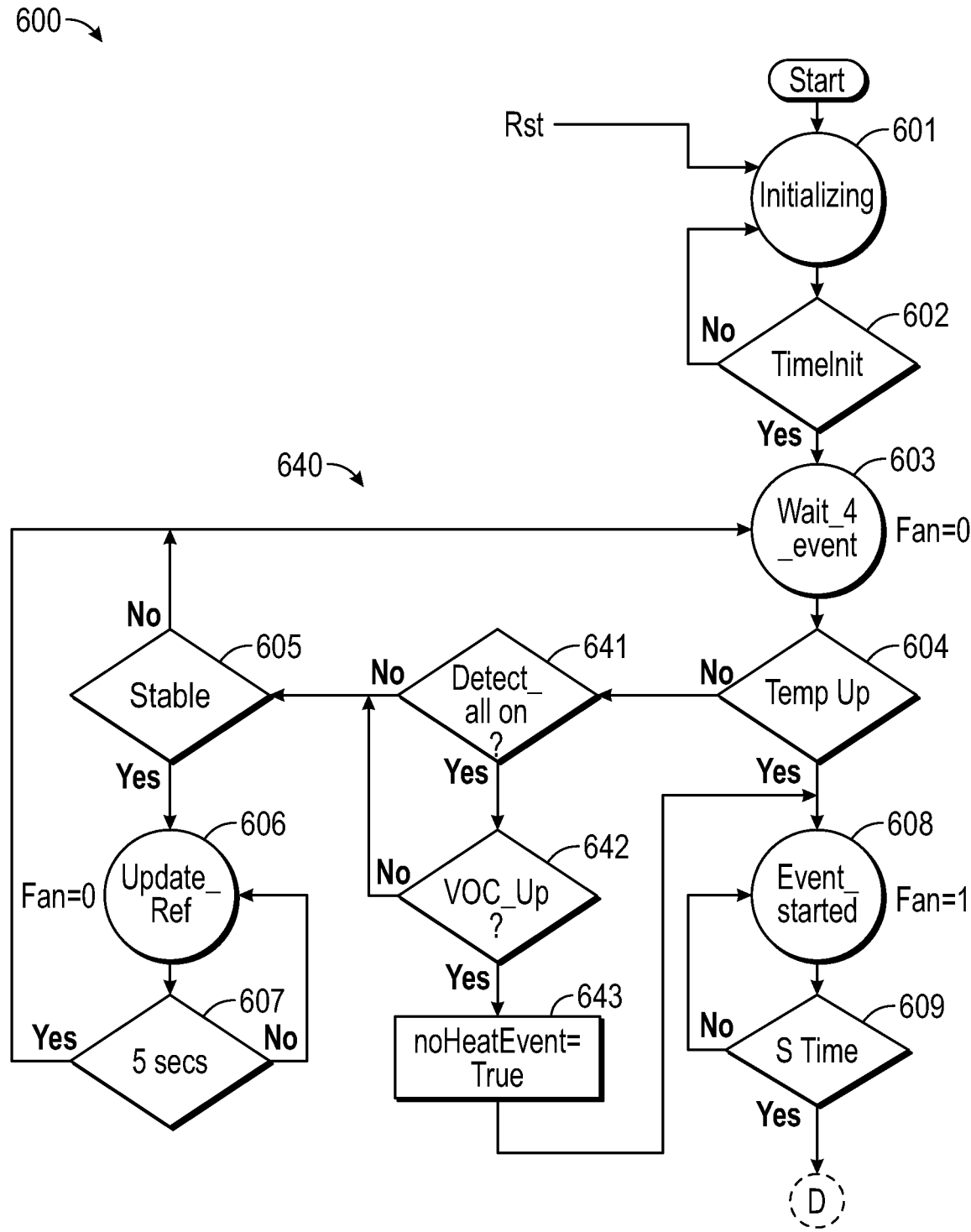
FIGS. 17A-17C are diagrammatic views of another illustrative process for operating venting systems in accordance with the present disclosure.
Figure 17B:
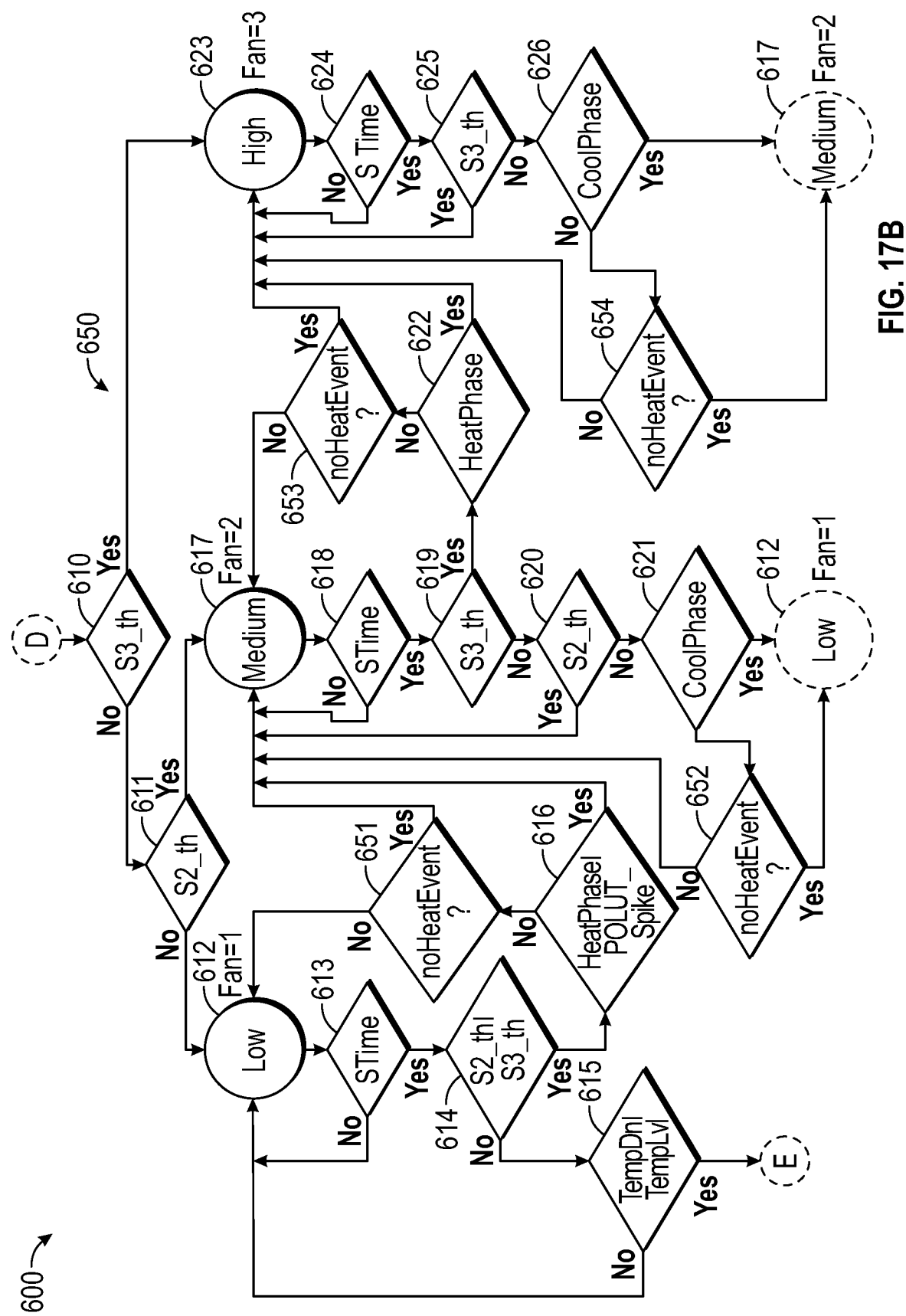
Figure 17C:
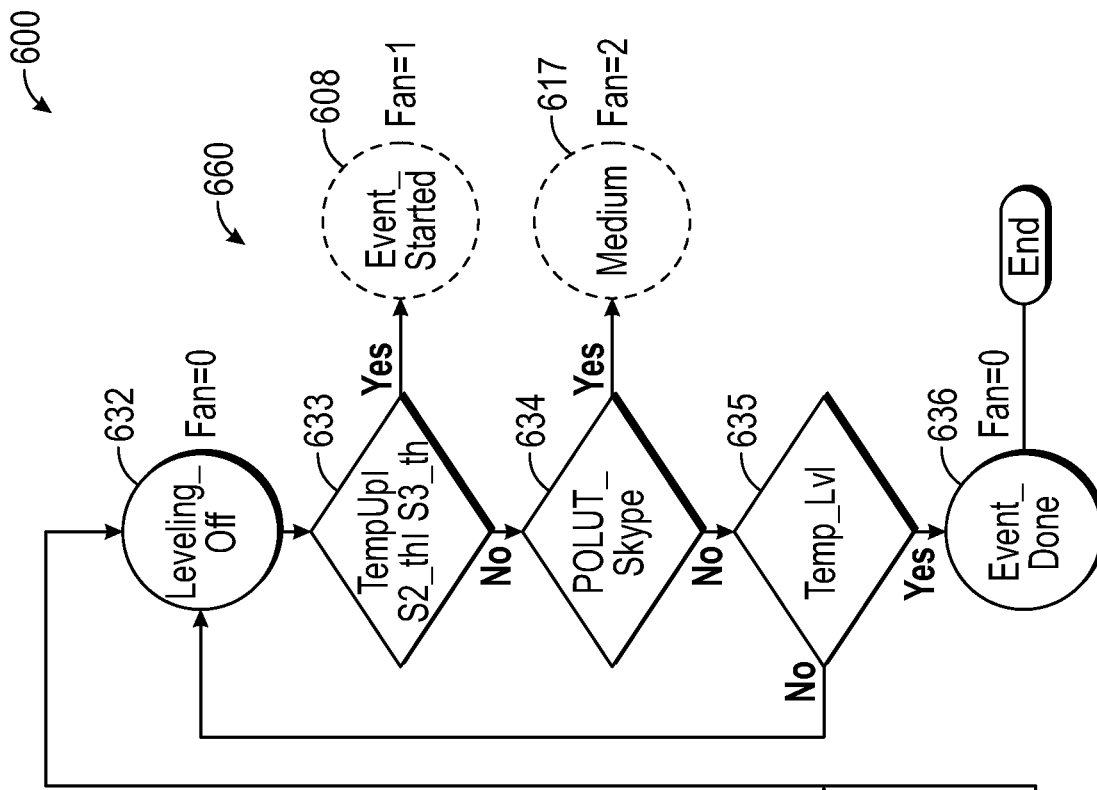
Figure 17C:
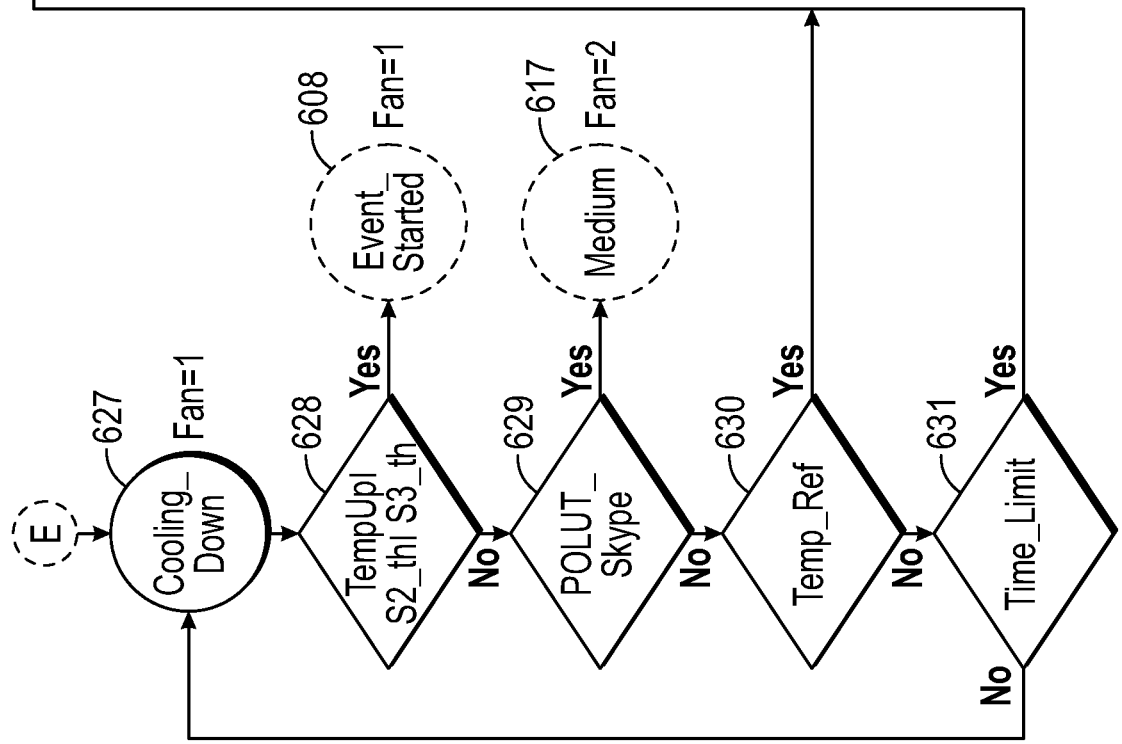

Another illustrative process 600 for operating the venting systems of the present disclosure, including venting system 510, is shown in FIGS. 17A-17C. The process 600 is similar to the process 300 of FIGS. 4A-4C, and starts with an initializing operation 601 where ambient conditions of the environment are measured with the IAQ event detector 514 as suggested in FIG. 17A. In the illustrative embodiments, an initialization time count operation 602 is conducted to provide a delay for the IAQ event detector 514 to initialize before beginning an event detection cycle 640.

After the initializing time delay has completed, the event detection cycle 640 runs to determine if an IAQ event has begun as suggested in FIG. 17A. In the illustrative embodiment, the event detection cycle 640 includes operations 603-607 and 641-643. A waiting operation 603 provides a delay between measurements by the IAQ event detector 514 for detecting changes from the previously measured ambient conditions in the environment. A temperature check operation 604 measures characteristics of the environment and determines if a change from the ambient conditions is observed. If no increase is observed, a selection check operation 641 determines if the IAQ event detector 514 is set to take additional measurements. This may be pre-set by the manufacturer or manually set by a user. If set, the IAQ event detector 514 measures the pollutant levels, such as VOC's, in the environment in an operation 642. If measurements from operation 642 indicate an unstable upward trend compared to the ambient conditions, a no heat event, such as oven cleaning, is detected. A "noHeatEvent" status indicator is set to true in an operation 643 and the ventilation fan 512 is turned on to a low level (1) at operation 608. If the pollutant measurements are stable or unstable in a downward trend (i.e., less likely to indicate an IAQ event) as determined in operation 642 and the measurements from operation 604 are stable or unstable in a downward trend as determined in an operation 605, a reference update operation 606 is conducted to establish a new ambient baseline. A waiting operation 607 provides a delay for the reference measurement update. Waiting operation 603 is then again conducted. In some embodiments, measurements of the operation 604 are stable relative to the ambient conditions if they are below a threshold percentage change from ambient and/or below a lower threshold level. In some embodiments, the determination of the operation 604 can be based on a relative percentage comparison, such as for an IR sensor 522 reading of the temperature of a cook top, or a comparison to a threshold level.

If measurements from operation 604 indicate an unstable upward trend compared to the ambient conditions, an IAQ event is detected and the ventilation fan 512 is turned on to a low level (1) at operation 608 as suggested in FIG. 17A. In the illustrative embodiment, a start time count operation 609 is conducted to provide a delay before beginning a conditioning cycle 650. After the start time delay has completed, the conditioning cycle 650 begins to condition the air in the environment as suggested in FIGS. 17A and 17B. The conditioning cycle 650 includes determining the required operating speed for the ventilation fan 512 to effectively address the IAQ event in an energy efficient manner. For example, some IAQ events require the ventilation fan 512 to operate at a high speed (3) to clear large quantities of smoke. In another example, boiling water on a cook top produces a small increase in humidity that can be compensated by the ventilation fan 512 running at the low speed (1).

In the illustrative embodiment of FIGS. 17A-17C, the conditioning cycle 650 starts with operations 610, 611 for initially determining the proper speed for the ventilation fan 512 as suggested in FIG. 17B. Each of the operations 610, 611 can include a check of the sensors in the IAQ event detector 514. A determination to operate in a first scenario (S1_th) is made based on both the air pollutant reading and humidity reading being below a lower threshold level, and the ventilation fan 512 can run at a low setting (1) in operation 612. A determination to operate in a third scenario (S3_th) is made based on either one, or both, of the air pollutant reading and humidity reading being above an upper threshold level, and the ventilation fan 512 can run at a high setting (3) in operation 623. A determination to operate in a second scenario (S2_th) is made where neither of the first or third scenarios applies, and the ventilation fan 512 can run at a medium setting (2) in operation 617. Start time count operations 613, 618, 625 can be conducted to provide a delay before reevaluating the proper fan level. After the start time delay has completed, additional sensor checks and evaluations are conducted at operations 614-616, 619-622, and 625-626 to determine if the conditions in the environment have changed requiring a higher or lower setting of the ventilation fan 512 as part of the conditioning cycle 650. Other scenarios are contemplated by the present disclosure based on varying combinations of the measured conditions in the environment.

Detection of a no heat event in operations 641-643 (FIG. 17A) of process 600 biases the ventilation fan 512 to run in higher speed settings in operations 651, 653 where detected levels of pollutants and/or humidity are elevated and there is a lack of temperature change that would otherwise cause operation of the ventilation fan 512 at the higher speed settings, such as in operations 616, 622, as shown in FIG. 17B. Similarly, detection of a no heat event biases the ventilation fan 512 to run in lower speed settings in operations 652, 654 where detected levels of pollutants and/or humidity are decreasing and there is a lack of temperature change that would otherwise cause operation of the ventilation fan 512 at the lower speed settings, such as in operations 621, 626. In some embodiments, each of the operations 612, 617, 623 can include a waiting operation to provide a delay between measurements taken in the operations 614-616, 619-622, and 625-626 for detecting changes from the previously measured conditions in the environment. In some embodiments, various delays can be built into the process 600 to avoid rapid changes in the operating speed of the ventilation fan 512 so as not to draw attention to the ventilation fan 512 and distract a user from a cook top.

The conditioning cycle 650 operates to drive the conditions in the environment toward the first scenario as suggested in FIG. 17B. As the IAQ event is cleared and the measured conditions in the environment trend downward, a determination is made in the operation 615 to operate a finish cycle 660 as suggested in FIGS. 17B and 17C. The finish cycle 660 begins with a cooling down operation 627 where the ventilation fan 512 is run at the low setting (1) and the conditions in the environment are monitored in operations 628-631 as suggested in FIG. 17C. The conditioning cycle 650 is run again if the measured values trend upward or a spike is indicated (e.g., relative change in measured value is above threshold level). When the measured values fall below a threshold level (e.g., a relative amount above ambient) or a time limit is reached, a leveling off operation 632 is conducted to turn off the ventilation fan 512. Further monitoring is conducted in operation 633-635, and the conditioning cycle 650 is run again if the measured values trend upward or a spike is indicated. When the measured values fall below another threshold level (e.g., ambient), it is determined that the IAQ event is done at operation 636 and the process 600 is ended. In some embodiments, the process 600 is run in a continuous loop where the output of the operation 636 is directed back to the initializing operation 601. In some embodiments, a user can manually reset the process 600 back to the initializing operation 601 as suggested in FIG. 17A.

One of the main contributors to poor indoor air quality is a failure by users to operate ventilation fans during an IAQ event where pollutants are being introduced into the indoor environment. The systems of the present disclosure provide for automatic operation of ventilation fans to condition indoor air. The systems of the present disclosure also operate ventilation fans at appropriate levels to improve indoor air quality in an energy efficient manner. Having a system that can detect pollutants and automatically turn on and adjust the exhaust fan speed takes this burden away from the user or occupants.

In illustrative embodiments, a "smart" IAQ pollutant detection system is provided that senses pollutants from cooking events or other typical household activities that generate IAQ pollutants, and automatically activates and adjusts exhaust ventilation fan speeds according to concentrations detected in order to remove the contaminants efficiently and reduce occupant exposure. The system chooses ventilation rates that do not over-ventilate or under-ventilate the area. The smart IAQ detection system can have the capability to inhibit intermittent operation or nuisance tripping that could be triggered by any of the sensors but not related to a cooking event or other IAQ pollutant activities.

In illustrative embodiments, the IAQ event detector includes a printed circuit board (PCB) with a Microcontroller unit (MCU), a universal asynchronous receiver-transmitter (UART) connection, power protection and regulation, a bi-directional level shifter, and three sensors: (i) a volatile Organic Compound (VOC) Sensor—detection of cooking and natural gas effluent; (ii) a Temperature/Humidity Sensor—detection of relative humidity and ambient temperature; and (iii) an Infrared (IR) Temperature Sensor—detection of cook top/cooking utensil temperature.

In illustrative embodiments, the PCB connects to a motor/control board of the ventilation fan through the UART port and communicates with the motor/control board. The sensors monitor the ambient conditions and set a relative ambient baseline and update the baseline based on changing ambient conditions, such as day/night and seasonal changes. The sensors continue to monitor ambient conditions until a cooking or other IAQ event is detected and change the exhaust fan speed based on predefined threshold values. The sensors continue to monitor ambient conditions until the cooking or other IAQ event has ended and baseline ambient conditions are met, and the exhaust fan is turned off.

Some venting systems only detect a specific reading, depending on the application. For range hoods, the temperature can be used for a backup safety measure, but not for controlling cooking pollutants. In bath fans, humidity and motion detection can be used to turn on an exhaust fan. However, neither of these systems takes into account a wider range of IAQ measurements and are not intended for controlling this wider range of pollutants as triggers to activate a ventilation fan. These systems also do not have any "smart" functionality, and only trigger on trip points for the specific measurement.

Some advantages of the venting systems of the present disclosure over other venting systems include:

(1) Taking into account a wider range of IAQ pollutants to detect when there are events that require exhausting of IAQ pollutants.

(2) Nuisance tripping reduction logic based on multiple inputs. The system can require multiple inputs to be within a specified range to be considered an "event". Such nuisance tripping events that can be eliminated is turning on an exhaust fan due to some additional PM2.5 particles present in the air after vacuuming or sweeping.

(3) Exhaust fans will stay on for a duration of time that is needed to bring the IAQ pollutant levels back to pre-event or "safe" level. Other systems are time-based, not IAQ pollutant concentration based.

(4) Robust detection of typical IAQ pollutant events based on cooking with a range hood.

In illustrative embodiments, the smart IAQ system could be integrated into a closed loop system for a range hood in a kitchen or cooking environment or a bathroom exhaust fan that would detect the presence of IAQ pollutants and automatically turn on and adjust the exhaust fan speed. Other closed loop systems could include air exchangers, HVAC systems, and IAQ monitors.

In illustrative embodiments, the same system could be used externally to an exhaust system, such as a general purpose standalone IAQ device, or a sensing wall switch (sensors packaged in the confines of a wall switch). These sensors could independently activate exhaust fans through wired or wireless communication to an exhaust device automatically turning on and adjusting the exhaust fan speeds based on IAQ pollutant concentrations. A system of sensors could work to determine the best method of pollutant elimination in a multi-room or multi-device space, while not over- or under-ventilating. If the smart IAQ system is connected to multiple sensors and systems, the connected network could control multiple make-up air inlets and exhausts to balance the indoor air quality.

In illustrative embodiments, the smart IAQ system could use the HVAC system (fan only, heat, cool, humidity control) to improve IAQ based on what specific pollutants are detected. If higher concentrations of PM2.5 or dust is detected, the system could run the HVAC systems fan to circulate air through the indoor space, and thus through the system's air filtration system. If humidity levels are elevated, the system could use the AC condenser coils to remove moisture from the air. Balancing incoming outdoor air, exhausting pollutants and circulating existing indoor air could be accomplished with this system.

While the present disclosure describes various exemplary embodiments, the disclosure is not so limited. To the contrary, the disclosure is intended to cover various modifications, uses, adaptations, and equivalent arrangements based on the principles disclosed. Further, this disclosure is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims.

The invention claimed is:

1. A range hood for ventilating an indoor environment adjacent a cook top, the range hood comprising:
a ventilation fan adapted to move air within the indoor environment; and
an indoor air quality event detector comprising
a temperature sensor configured to measure one of a temperature of one or more objects and a temperature at the ventilation fan,
a pollutant sensor configured to measure the levels of one or more pollutants in the indoor environment,
a humidity sensor configured to measure a level of humidity in the indoor environment,
wherein the indoor air quality event detector is configured to selectively operate the ventilation fan in
a low speed when the temperature is above a first threshold level, the humidity level is below a second threshold level, and the pollutant level is below a third threshold level,
a high speed when the temperature is above the first threshold level, the humidity level is above the second threshold level, and the pollutant level is above the third threshold level, and
a medium speed when the temperature is above the first threshold level but the conditions for operating the ventilation fan in the low speed and the high speed are not met.

2. The range hood of claim 1, wherein the temperature sensor comprises an infrared temperature sensor having a field of view directed into the indoor environment and configured to measure a temperature of one or more objects in a field of view of the infrared temperature sensor.

3. The range hood of claim 1, wherein the indoor air quality event detector is configured to selectively operate the ventilation fan in response to:
one or more of the measured temperature, humidity level or pollutant level increasing by a percentage above a threshold percentage change from ambient conditions in the indoor environment.

4. The range hood of claim 1, wherein the temperature sensor comprises an ambient temperature sensor configured to measure a temperature at the ventilation fan.

5. The range hood of claim 1, wherein the temperature sensor comprises an ambient temperature sensor configured to measure a temperature at the ventilation fan, wherein the ventilation fan is operated at a first speed setting in response to a measured temperature at the ventilation fan rising above a first threshold level, wherein the ventilation fan is operated at a second speed setting in response to a measured temperature at the ventilation fan rising above a second threshold level, and wherein the ventilation fan is operated at a third speed setting in response to a measured temperature at the ventilation fan rising above a third threshold level.

6. The range hood of claim 1, further comprising a second temperature sensor located in a different position than the temperature sensor, and wherein the ventilation fan is selective operated in response to a difference between measured temperatures of the temperature sensor and the second temperature sensor.

7. The range hood of claim 1, wherein the indoor air quality event detector is configured to selectively operate the ventilation fan in response to one or more of the measured temperature, humidity level or pollutant level increasing by a rate of change above a threshold rate of change.

8. The range hood of claim 6, wherein the second temperature sensor is an infrared temperature sensor having a field of view directed into the indoor environment and configured to measure a temperature of one or more objects in a field of view of the infrared temperature sensor.

9. The range hood of claim 6, wherein the second temperature sensor is an ambient temperature sensor configured to measure a temperature at the ventilation fan.

10. The range hood of claim 1, wherein the ventilation fan is positioned over a cook top.

11. The range hood of claim 1, wherein the indoor air quality event detector is positioned at a location remote from the ventilation fan.

12. A venting system comprising:
a ventilation fan positioned relative to an indoor environment, the ventilation fan adapted to move air within the indoor environment; and
an indoor air quality event detector having
an infrared temperature sensor having a field of view directed into the indoor environment and configured to measure a temperature of one or more objects in a field of view of the infrared temperature sensor,
a pollutant sensor configured to measure the levels of one or more pollutants in the indoor environment,
an ambient temperature sensor configured to measure a temperature at the ventilation fan, and
a humidity sensor configured to measure a level of humidity in the indoor environment,
wherein the indoor air quality event detector is configured to selectively operate the ventilation fan in:
a low speed when the ambient temperature is above a first threshold level, the humidity level is below a second threshold level, and the pollutant level is below a third threshold level,
a high speed when the ambient temperature is above the first threshold level, the humidity level is above the second threshold level, and the pollutant level is above the third threshold level, and
a medium speed when the ambient temperature is above the first threshold level but the conditions for operating the ventilation fan in the low speed and the high speed are not met.

13. A method for operating a venting system, the method comprising:
measuring with at least one sensor; at least one of the following characteristics of an indoor environment
a temperature in the indoor environment,
a pollutant level in the indoor environment, and
a humidity level in the indoor environment
monitoring for an indoor air quality event in the indoor environment based on the measured at least one characteristic of the indoor environment; and
selectively operating a ventilation fan positioned relative to the indoor environment with the indoor air quality event detector to condition air within the indoor environment in response to detecting the indoor air quality event, by operating the ventilation fan in:
a low speed when the temperature is above a first threshold level, the humidity level is below a second threshold level, and the pollutant level is below a third threshold level,
a high speed when the temperature is above the first threshold level, the humidity level is above the second threshold level, and the pollutant level is above the third threshold level, and a medium speed when the temperature is above the first threshold level but the conditions for operating the ventilation fan in the low speed and the high speed are not met.

14. The method of claim 13, further comprising determining an operating speed of the ventilation fan based the measured at least one characteristics of the indoor environment.

15. The method of claim 13, selectively operating the ventilation fan includes changing the speed of the ventilation fan.

16. The method of claim 13, wherein the venting system comprises a range hood.

17. The range hood of claim 1, wherein the indoor air quality event detector is configured to selectively change the speed of the ventilation fan.

18. The venting system of claim 12, wherein the indoor air quality event detector is configured to selectively change the speed of the ventilation fan.

19. The venting system of claim 12, wherein a range hood comprises the ventilation fan.

\* \* \* \* \*